(12) United States Patent
Hoda

(10) Patent No.: US 9,574,514 B2
(45) Date of Patent: Feb. 21, 2017

(54) CONTROL APPARATUS FOR INTERNAL COMBUSTION ENGINE

(75) Inventor: Ikuo Hoda, Nagoya (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 564 days.

(21) Appl. No.: 14/236,154

(22) PCT Filed: Aug. 3, 2011

(86) PCT No.: PCT/JP2011/067755
§ 371 (c)(1),
(2), (4) Date: Jan. 30, 2014

(87) PCT Pub. No.: WO2013/018210
PCT Pub. Date: Feb. 7, 2013

(65) Prior Publication Data
US 2014/0156173 A1    Jun. 5, 2014

(51) Int. Cl.
*F02D 41/34*    (2006.01)
*F02D 41/00*    (2006.01)
*F02D 19/08*    (2006.01)

(52) U.S. Cl.
CPC ......... *F02D 41/345* (2013.01); *F02D 41/0025* (2013.01); *F02D 19/085* (2013.01);
(Continued)

(58) Field of Classification Search
CPC .. F02D 35/028; F02D 41/009; F02D 41/0097; F02D 41/1497; F02D 41/2438; F02D 41/2441; F02D 41/2451; F02D 41/2464; F02D 41/30; F02D 41/3005; F02D 2200/0611; F02D 2200/0612; F02D 2200/10;F02D 2200/1002; F02D 2200/1004
See application file for complete search history.

(56) References Cited

U.S. PATENT DOCUMENTS 4,909,225 A * 3/1990 Gonze ................. F02D 19/0605
123/1 A
2008/0270005 A1* 10/2008 Tooyama ............ F02D 41/0025
701/103
(Continued)

FOREIGN PATENT DOCUMENTS

EP        2 037 106 A1    3/2009
JP        2007-239738    9/2007
(Continued)

*Primary Examiner* — Erick Solis
*Assistant Examiner* — Anthony L Bacon
(74) *Attorney, Agent, or Firm* — Finnegan, Henderson, Farabow, Garrett & Dunner, LLP

(57) ABSTRACT

An electronic control unit calculates a rotation variation amount ΣΔNE as a cetane number index value of the fuel supplied to an internal combustion engine and executes fuel injection control in a first execution mode corresponding to the rotation variation amount ΣΔNE (S407, S408). In a mixing period in which the cetane number of the fuel supplied to the internal combustion engine is changed due to the fuel feed into the fuel tank (S401: YES), the fuel injection control is executed in a second execution mode such that, compared with the first execution mode, stable operation of the internal combustion engine is given more importance (S402:YES, S403). When calculation of the rotation variation amount ΣΔNE is executed during the mixing period (S404: YES), fuel injection control is executed while limiting the reflection of the rotation variation amount ΣΔNE (S405, S406).

6 Claims, 11 Drawing Sheets

(52) U.S. Cl.
CPC .......... *F02D 2200/0611* (2013.01); *F02D 2200/0612* (2013.01); *F02D 2200/101* (2013.01); *F02D 2200/1012* (2013.01); *Y02T 10/36* (2013.01)

(56) References Cited

U.S. PATENT DOCUMENTS

| | | | |
|---|---|---|---|
| 2009/0145199 A1* | 6/2009 | Kuronita | G01N 33/2829 73/35.02 |
| 2009/0314267 A1 | 12/2009 | Kawai et al. | |
| 2010/0030453 A1 | 2/2010 | Takahashi et al. | |
| 2010/0312459 A1 | 12/2010 | Utsumi | |

FOREIGN PATENT DOCUMENTS

| | | |
|---|---|---|
| JP | 2007-321706 | 12/2007 |
| JP | 2008-51063 | 3/2008 |
| JP | 2008-64022 | 3/2008 |
| JP | 2008-255993 | 10/2008 |
| JP | 2009-68445 | 4/2009 |
| JP | 2009-144640 | 7/2009 |
| JP | 2010-77829 | 4/2010 |
| JP | 2010-180715 | 8/2010 |
| JP | 2010-208700 | 9/2010 |

* cited by examiner

F I G . 6
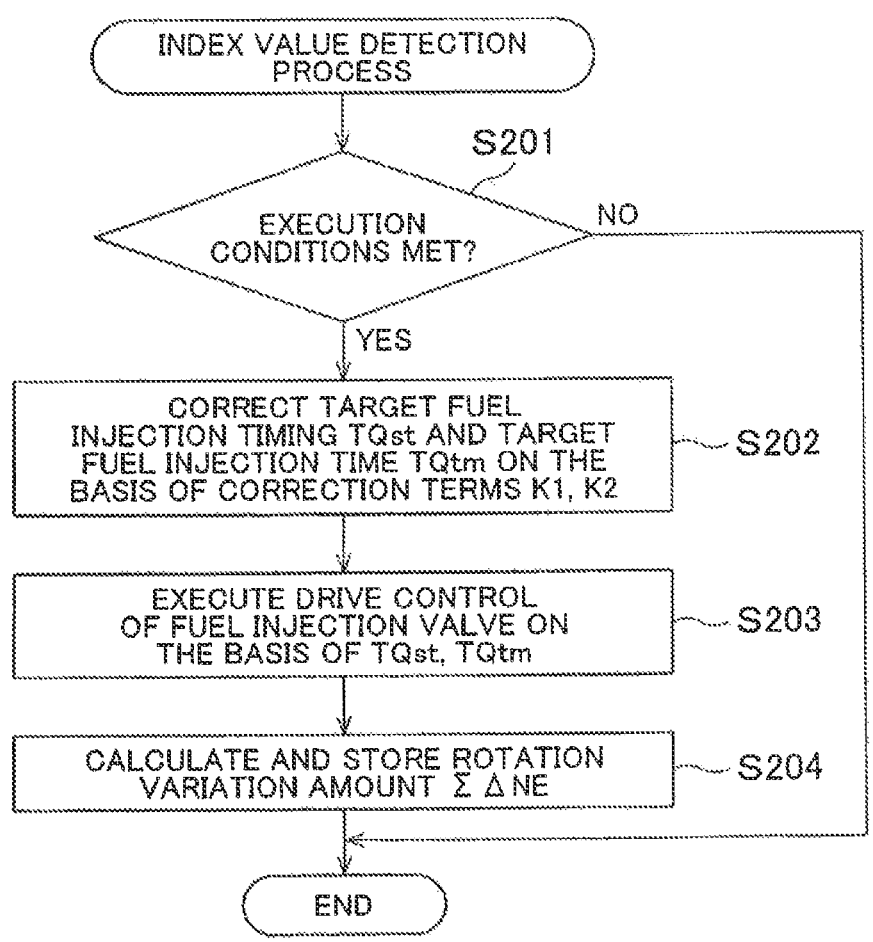

CONTROL APPARATUS FOR INTERNAL COMBUSTION ENGINE

CROSS-REFERENCE TO RELATED APPLICATIONS

This application is a national phase application of International Application No. PCT/JP2011/067755, filed Aug. 3, 2011, the content of which is incorporated herein by reference.

TECHNICAL FIELD

The present invention relates to a control apparatus for an internal combustion engine that estimates a property of fuel supplied to an internal combustion engine and executes engine operation control on the basis of the estimated fuel property.

BACKGROUND ART

A property of fuel that is fed into a fuel tank (such as the cetane number of diesel fuel, the octane number of gasoline fuel, or concentration of alcohol fuel, for example) is not necessarily uniform and changed greatly depending on a country or a region. Thus, it can be said that the property of the fuel supplied to an internal combustion engine is not uniform either and that such a variation in the fuel property can be a cause to inhibit stabilizing a combustion state of the fuel.

Conventionally, it has been practiced to estimate the property of the fuel supplied to the internal combustion engine and to execute combustion control for combustion of the fuel on the basis of the estimated fuel property.

For example, Patent Document 1 describes an apparatus that estimates an alcohol fuel mixing rate of fuel supplied to an internal combustion engine on the basis of a detected signal from an air-fuel ratio sensor and that executes air-fuel ratio control on the basis of the estimated alcohol fuel mixing rate in the internal combustion engine for which either one of gasoline fuel and alcohol fuel or mixed fuel thereof can be used. In the apparatus described in Patent Document 1, when the fuel is fed, an estimated value that is estimated and stored before feeding of the fuel is adapted to be used for the air-fuel ratio control in a period until the entire fuel in a fuel pipe for supplying the fuel from a fuel tank to the internal combustion engine is consumed,

PRIOR ART DOCUMENTS

Patent Documents

Patent Document 1: Japanese Patent Application Publication No. 2009-68455 (JP 2009-68455 A)

SUMMARY OF THE INVENTION

Problem to be Solved by the Invention

When the fuel is fed into the fuel tank, the property of the fuel that is supplied to the internal combustion engine is changed. Thus, in the apparatus that estimates the fuel property for use in the combustion control as described above, generation of a difference between the estimated value and an actual value of the fuel property is unavoidable at this time.

In general, when the property of the fuel stored in the fuel tank is changed along with the fuel feed, the property of the fuel in the fuel pipe, that is, the property of the fuel supplied to the internal combustion engine is gradually changed from the fuel property before the fuel feed to the fuel property after the fuel feed. Thus, when a change in the stored fuel property is large, the difference between the estimated value and the actual value of the fuel property is increased, thereby causing possible degradation in the combustion state of the fuel as well as failure in stable operation of the internal combustion engine in some cases.

The present invention has been made in view of such circumstances, and therefore has an object to provide a control apparatus for an internal combustion engine that allows stable engine operation immediately after feeding of fuel.

Means for Solving the Problem

Means for achieving the above object and effects thereof will be described below.

In order to achieve the above purpose, a control apparatus for an internal combustion engine according to the present invention estimates a property of fuel that is supplied to an internal combustion, engine, and executes combustion control for combustion of the fuel in a first execution mode that corresponds to an estimated fuel property that has been estimated. It should be noted that the combustion control is engine control for adjusting a combustion state of the fuel in a cylinder of the internal combustion engine, such as fuel injection control or EGR control, for example.

Then, when the fuel is fed into a fuel tank, the combustion control is executed in a second execution mode in which stable operation of the internal combustion engine is given more importance than in the first execution mode in a period that the property of the fuel supplied to the internal combustion engine is changed by the fuel feed. Accordingly, despite a fact that the property of the fuel supplied to the internal combustion engine is changed immediately after the execution of the fuel feed, it is possible through the execution of the combustion control in the second execution mode at this time to prevent an engine operation state from becoming unstable.

In the period that the property of the fuel supplied to the internal combustion engine is changed, even if estimation of the estimated fuel property is executed, a difference between the estimated fuel property and an actual fuel property is likely to occur along with a change in the fuel property thereafter. Thus, if the combustion control is executed in the first execution mode that corresponds to the estimated fuel property that is estimated at this time, the engine operation state may be unstabilized depending on a direction or a magnitude of the difference.

In the above apparatus, when the estimation of the estimated fuel property is executed in such a period, reflection of the estimated fuel property is restricted, and the combustion control is executed in the second execution mode, instead of simply switching the execution mode of the combustion control to the first execution mode corresponding to the estimated fuel property that is estimated at this time. Thus, it is possible to prevent the engine operation state from becoming unstable due to switching to the execution mode corresponding to the estimated fuel property that is estimated in the above period.

Therefore, according to the above apparatus, the stable engine operation can be achieved, immediately after the fuel is fed into the fuel tank.

In one aspect of the present invention, an execution mode in which a temporary estimated fuel property is calculated on the basis of an amount of the fuel stored in the fuel tank during initiation of the fuel feed, the estimated fuel property that is estimated during the initiation of the fuel feed, and an amount of the fuel that is fed into the fuel tank and in which the combustion control is executed on the basis of the temporary estimated fuel property is set as the second execution mode.

According to the above apparatus, the property of the fuel in the fuel tank after the fuel feed can be estimated under an assumption that the property of the fuel that is fed into the fuel tank is in a prescribed state. Accordingly, by defining an appropriate state (for example, the fuel property that is most likely to cause the unstabilized engine operation state within an assumed range [the worst fuel property]) as the above prescribed state, it is possible to calculate the temporary estimated fuel property as an index value to measure a degree of change in the property of the fuel in the fuel tank after the fuel feed in a case where the fuel with the worst fuel property is fed. Thus, because the combustion control is executed in a manner to correspond to the temporary estimated fuel property, it is possible to avoid a situation where the combustion control is executed in a manner to correspond to the fuel property that is more likely to unstabilize the engine operation state than the actual fuel property when the property of the fuel in the fuel tank is changed by the fuel feed. As described above, according to the above apparatus, it is possible to favorably prevent the engine operation state from becoming unstable immediately after the feeding of the fuel into the fuel tank.

In the aspect of the present invention, the fuel is diesel fuel, and the fuel property is the cetane number.

In such an apparatus, the combustion control is executed in the second execution mode (for example, an execution mode that corresponds to the lowest cetane number within an assumed range) in which the stable operation of the internal combustion engine is given more importance than in the first execution mode in a period that the cetane number of the fuel supplied to the internal combustion engine is changed due to the feeding of the fuel into the fuel tank. Therefore, despite the fact that the cetane number of the fuel supplied to the internal combustion engine is changed immediately after the execution of the fuel feed, it is possible to prevent the engine operation state from becoming unstable through the execution of the combustion control in the second execution mode at this time.

In a case where the estimating section executes the estimation of the cetane number of the fuel in the above period, and where the combustion control is executed in the first execution mode that corresponds to the estimated fuel property to cetane number estimated value) that is estimated at this time, the combustion control is executed with the cetane number of the fuel that is lower than expected when the cetane number estimated value is higher than the cetane number of the fuel that is actually supplied to the internal combustion engine. Consequently, the combustion state of the fuel becomes unstable at this time, and the engine operation state may be unstabilized.

In the above apparatus, when the estimation of the cetane number estimated value is executed in such a period, instead of simply switching the execution mode of the combustion control to the first execution mode that corresponds to the cetane number estimated value that is estimated at this time, the combustion control is executed in the second execution mode while the reflection of the cetane number estimated value is restricted. Accordingly, it is possible to prevent the engine operation state from becoming unstable due to switching to the execution mode that corresponds to the cetane number estimated value that is estimated in the above period.

Preferably, instead of the basic injection control in which the fuel injection is executed in the amount corresponding to the operation state of the internal combustion engine is executed, the auxiliary injection control is executed in which the fuel injection for estimating the cetane number of the fuel is executed, the index value of the engine torque that is generated along with the auxiliary injection control is detected, and the detected index value is stored as the estimated fuel property.

According to the apparatus, because the engine torque generated by the fuel injection in the prescribed amount is changed according to the cetane number of the fuel, the cetane number of the fuel can be estimated on the basis of the index value of the engine torque generated along with the fuel injection.

Preferably, under an assumption that the combustion control according to the estimated fuel property is executed, the reflection of the estimated fuel property that is estimated by the estimating section in the above period is permitted in a circumstance where the combustion state of the fuel is improved, and the reflection is prohibited when the combustion state of the fuel is degraded.

According to the apparatus, in a case where the estimated fuel property that is estimated in the above period is reflected to the combustion control, the estimated fuel property can be reflected to the combustion control only when the improvement of the combustion state of the fuel can be expected; therefore, it is possible to favorably prevent the operation state of the internal combustion engine from becoming unstable.

In the above apparatus, when the cetane number is adopted as the fuel property, for example, and when the cetane number that is estimated in the above period (the cetane number estimated value) is larger than the cetane number that is estimated in the second execution mode of the combustion control at this time, the reflection of the cetane number estimated value to the combustion control is prohibited. On the contrary, when the cetane number estimated value that is estimated in the above period is smaller than the cetane number that is estimated in the second execution mode of the combustion control at this time, the reflection of the cetane number estimated value to the combustion control is permitted.

Preferably, when the estimated fuel property is estimated by the estimating section for the plurality of times in a period that the fuel property is changed, a value that corresponds to the estimate fuel property for each time is calculated on the basis of the latest value of the estimated fuel property, the estimated timing of the latest value, the last value of the estimated fuel property, the estimated timing of the last value, and the elapsed period from the estimated timing of the latest value.

According to such an apparatus, it is possible to predict a mode of change of the estimate fuel property in the above period and to calculate the value that corresponds to the estimate fuel property for each time on the basis of the prediction. Accordingly, a determination of whether or not the improvement of the combustion state of the fuel can be expected can be made on the basis of the estimate fuel property at the timing that the estimated fuel property is estimated, and can also be made on the basis of a value that corresponds to the estimate fuel property for each time for each time. Therefore, the number of opportunities to reflect the estimated fuel property to the combustion control can be increased in order to improve the combustion state of the fuel, and thus it is possible to favorably prevent the operation state of the internal combustion engine from becoming unstable.

In the aspect of the present invention, the period that the property of the fuel is changed is a period until the entire fuel in the fuel pipe for supplying the fuel in the fuel tank to the internal combustion engine is replaced by the fuel that is pressure-fed from the fuel tank to the fuel pipe after the fuel feed.

BRIEF DESCRIPTION OF THE DRAWINGS

FIG. 6 is a flowchart for showing a specific execution procedure of an index value detection process.

MODES FOR CARRYING OUT THE INVENTION

First Embodiment

A description will hereinafter be made on a control apparatus for an internal combustion engine according to a first embodiment that embodies the present invention.

Figure 1:
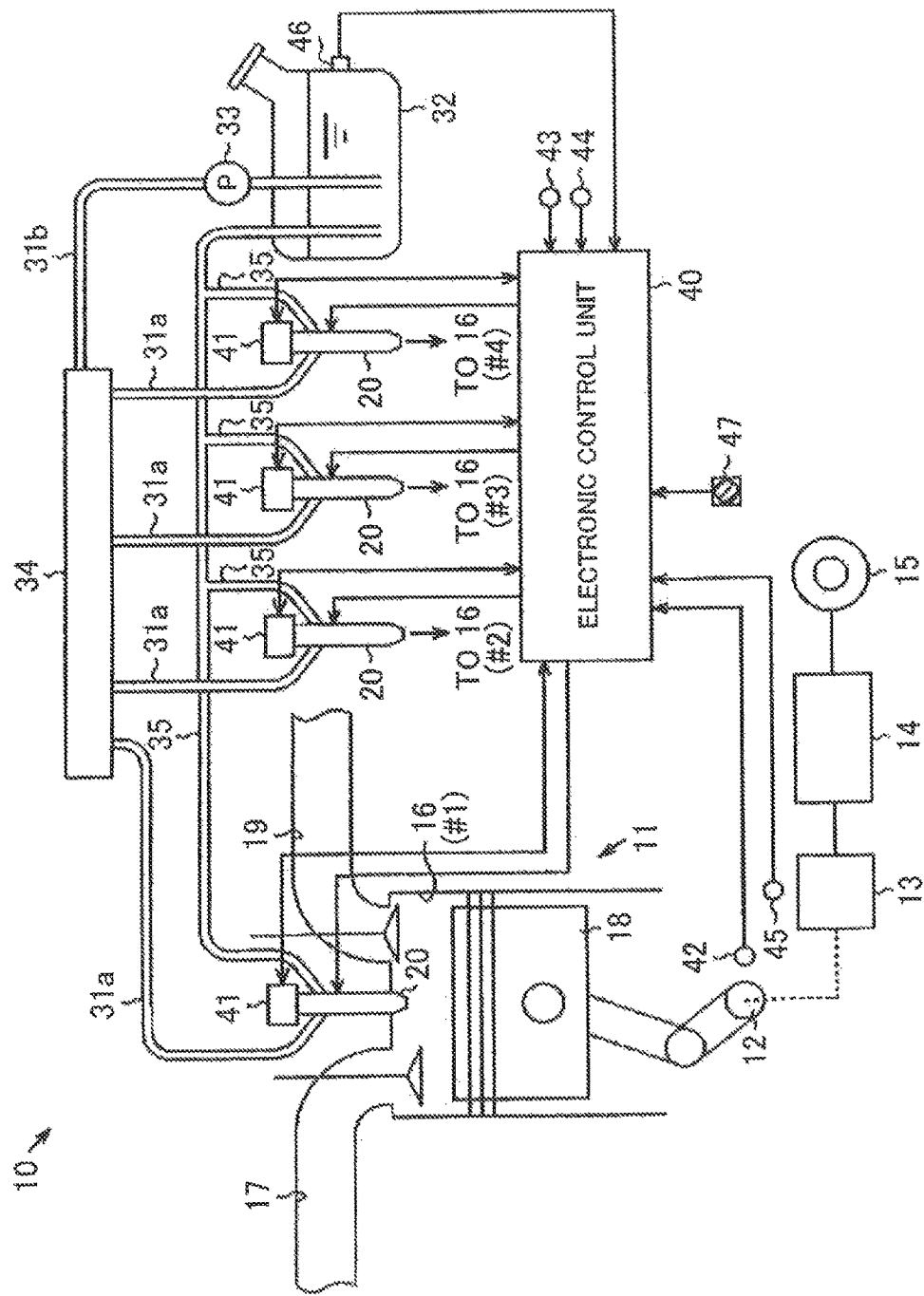
FIG. 1 is a schematic view for showing a schematic configuration of a control apparatus for an internal combustion engine according to a first embodiment that embodies the present invention.

As shown in FIG. 1, an internal combustion engine 11 is mounted as a drive source in a vehicle 10. A crankshaft 12 of the internal combustion engine 11 is connected to a wheel 15 via a clutch mechanism 13 and a manual transmission 14. When a clutch operating member (such as a clutch pedal) is operated by a driver in the vehicle 10, the clutch mechanism 13 is operated to disconnect the crankshaft 12 from the manual transmission 14.

An intake passage 17 is connected to a cylinder 16 of the internal combustion engine 11. Air is suctioned into the cylinder 16 of the internal combustion engine 11 via the intake passage 17. In addition, as the internal combustion engine 11, an engine that includes a plurality (four [#1 to #4] in this embodiment) of the cylinders 16 is adopted. In the internal combustion engine 11, a fuel injection valve 20 of a direct injection type that directly injects fuel, diesel fuel in this embodiment, into the cylinder 16 is attached to each of the cylinders 16. The fuel injected by valve opening drive of the fuel injection valve 20 comes into contact with the suctioned air that is compressed and heated in the cylinder 16 of the internal combustion engine 11, and is ignited and combusted. Then, in the internal combustion engine 11, a piston 18 is pushed downward by energy that is generated along with the combustion of the fuel in the cylinder 16, and the crankshaft 12 is forcibly rotated. Combustion gas that is combusted in the cylinder 16 of the internal combustion engine 11 is discharged as an exhaust to an exhaust passage 19 of the internal combustion engine 11.

Each of the fuel injection valves 20 is separately connected to a common rail 34 via a branch passage 31a, and the common rail 34 is connected to a fuel tank 32 via a supply passage 31b. A fuel pump 33 that pressure-feeds the fuel is provided in the supply passage 31b. In this embodiment, the fuel whose pressure is increased due to pressure feed by the fuel pump 33 is stored in the common rail 34 and supplied into each of the fuel injection valves 20. In addition, a return passage 35 is connected to each of the fuel injection valves 20, and each of the return passages 35 is connected to the fuel tank 32. The fuel in the fuel injection valve 20 is partially returned into the fuel tank 32 via the return passage 35.

An internal structure of the fuel injection valve 20 will be described below.

Figure 2:
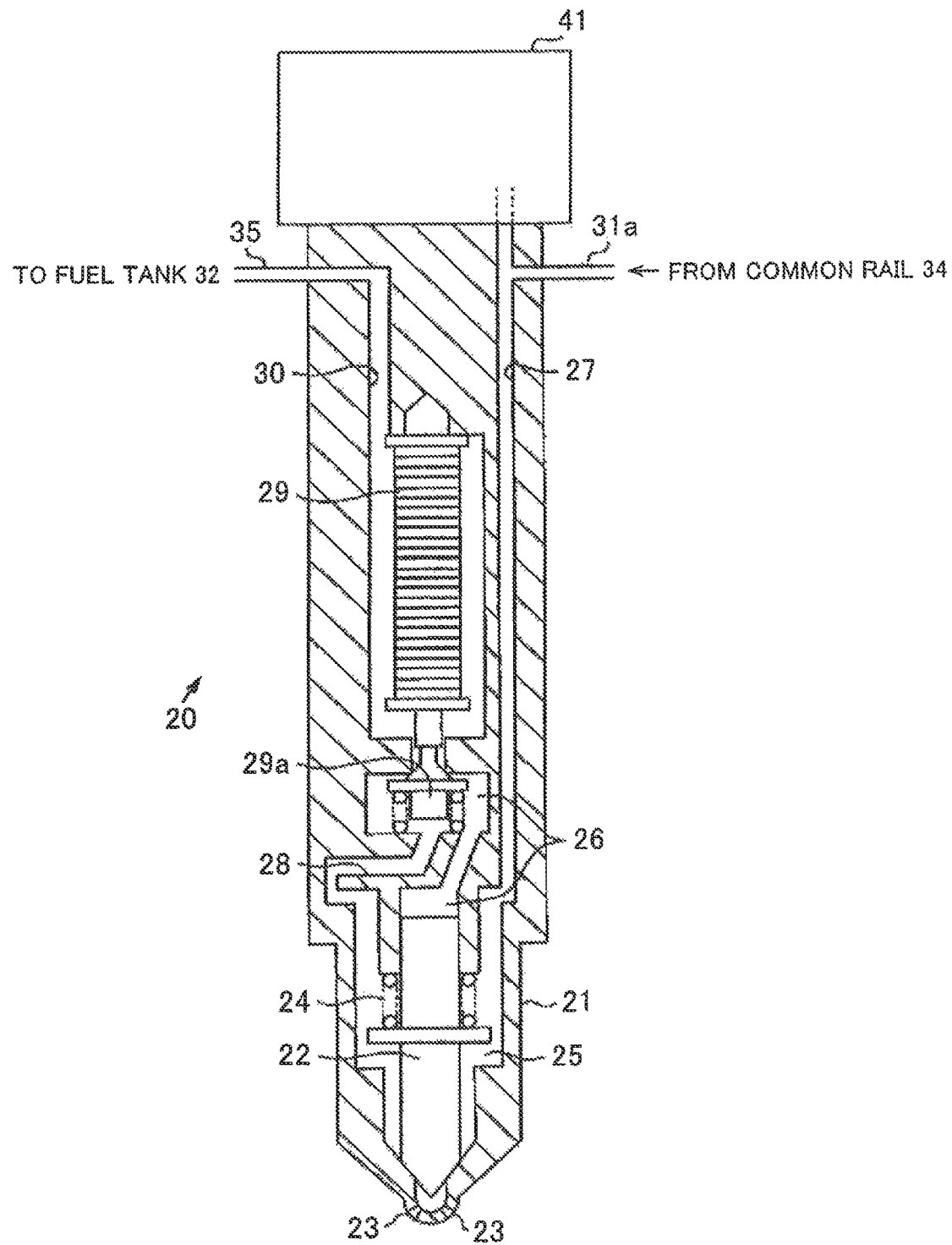
FIG. 2 is a cross-sectional view for showing a sectional structure of a fuel injection valve.

As shown in FIG. 2, a needle valve 22 is provided in a housing 21 of the fuel injection valve 20. The needle valve 22 is provided in the housing 21 in a manner capable of reciprocal motion (moving vertically in the drawing). A spring 24 that constantly urges the needle valve 22 to an injection hole 23 side (a lower side in the drawing) is provided in the housing 21. In addition, in the housing 21, a nozzle chamber 25 is provided in a location on one side (the lower side in the drawing), and a pressure chamber 26 is formed in a location on the other side (an upper side in the drawing) with the needle valve 22 being interposed therebetween.

The nozzle chamber 25 is formed with the plural injection holes 23 that communicate between the inside thereof and the outside of the housing 21, and the fuel is supplied thereto from the branch passage 31a (the common rail 34) via an inlet passage 27. The nozzle chamber 25 and the branch passage 31a (the common rail 34) are connected to the pressure chamber 26 via a communication passage 28. In addition, the pressure chamber 26 is connected to the return passage 35 (the fuel tank 32) via a discharge passage 30.

As the fuel injection valve 20, a fuel injection valve of an electric drive type is adopted, and a piezoelectric actuator 29 in which plural piezoelectric elements (such as piezo elements) compressed and expanded by input of a driving signal are stacked is provided in the housing 21. A valve body 29a is attached to the piezoelectric actuator 29, and the valve body 29a is provided in the pressure chamber 26. When the valve body 29a is moved by operation of the piezoelectric actuator 29, one of the communication passage 28 (the nozzle chamber 25) and the discharge passage 30 (the return passage 35) is selectively communicated with the pressure chamber 26.

In the fuel injection valve 20, when a valve closing signal is input to the piezoelectric actuator 29, the piezoelectric actuator 29 is contracted to move the valve body 29a, the communication passage 28 is communicated with the pressure chamber 26, and the communication between the return passage 35 and the pressure chamber 26 is blocked. Accordingly, the nozzle chamber 25 and the pressure chamber 26 are communicated in a state that the fuel in the pressure chamber 26 is prohibited from being discharged to the return passage 35 (the fuel tank 32). Thus, a pressure difference between the nozzle chamber 25 and the pressure chamber 26 becomes very small, the needle valve 22 is moved to a position to close the injection hole 23 by an urging force of the spring 24, and, at this time, the fuel injection valve 20 is brought into a state that the fuel is not injected (a closed valve state).

On the other hand, when a valve opening signal is input to the piezoelectric actuator 29, the piezoelectric actuator 29 is extended to move the valve body 29a, the communication between the communication passage 28 and the pressure chamber 26 is blocked, and the return passage 35 is communicated with the pressure chamber 26. Accordingly, the fuel in the pressure chamber 26 is partially returned into the fuel tank 32 via the return passage 35 in a state that the fuel is prohibited from flowing from the nozzle chamber 25 to the pressure chamber 26. Thus, the pressure difference between the pressure chamber 26 and the nozzle chamber 25 is increased due to the lowered fuel pressure in the pressure chamber 26, the needle valve 22 is moved against the urging force of the spring 24 by the pressure difference and separated from the injection hole 23, and, at this time, the fuel injection valve 20 is brought into a state that the fuel is injected (an open valve state).

A pressure sensor 41 that outputs a signal corresponding to fuel pressure PQ in the inlet passage 27 is integrally attached to the fuel injection valve 20. Accordingly, compared to an apparatus that detects fuel pressure at a location away from the fuel injection valve 20, such as the fuel pressure in the common rail 34 (see FIG. 1), for example, it is possible to detect the fuel pressure in a portion near the injection hole 23 of the fuel injection valve 20 and is also possible to accurately detect a change in the fuel pressure in the fuel injection valve 20 that is caused by opening of the fuel injection valve 20. It should be noted that the pressure sensor 41 is provided for each of the fuel injection valves 20, that is, for each of the cylinders 16 of the internal combustion engine 11.

As shown in FIG. 1, various sensors for detecting an operation state are provided as peripheral devices in the internal combustion engine 11. As the sensors, in addition to the pressure sensor 41 described above, a crank sensor 42 for detecting a rotational phase and a rotational speed of the crankshaft 12 (an engine speed NE) and an accelerator sensor 43 for detecting an operation amount (an accelerator operation amount ACC) of an accelerator operating member (such as an accelerator pedal) are provided, for example. In addition, a vehicle speed sensor 44 for detecting a traveling speed of the vehicle 10, a clutch switch 45 for detecting presence or absence of the operation of the clutch operating member, a stored amount sensor 46 for detecting an amount of the fuel that is stored in the fuel tank 32 (an stored fuel amount SP) are provided. Furthermore, an operation switch 47 that is turned ON when the operation of the internal combustion engine 11 is started and that is turned OFF when the operation thereof is stopped and the like are provided.

Moreover, as a peripheral device of the internal combustion engine 11, an electronic control unit 40 that is configured to include a microcomputer is provided, for example. The electronic control unit 40 functions as a memory section, a first control section, a second control section, an estimating section, and a calculating section, fetches output signals from various sensors, executes various types of computation based on the output signals, and executes various control for the operation of the internal combustion engine 11, such as drive control (the fuel injection control) of the fuel injection valve 20, according to computation results.

The fuel injection control of this embodiment is basically executed as follows.

First, a control target value of an fuel injection amount (a requested injection amount TAU) for the operation of the internal combustion engine 11 is calculated on the basis of the accelerator operation amount ACC, the engine speed NE, and the like. Then, based on the requested injection amount TAU and the engine speed NE, a control target value of fuel injection timing (requested injection timing Tst) and a control target value of fuel injection time (requested injection time Ttm) are calculated. Next, based on the requested injection timing Tst and the requested injection time Ttm, the valve opening drive of the each fuel injection valve 20 is executed. Accordingly, an amount of fuel suitable for the operation state of the internal combustion engine 11 at the time is injected from the each fuel injection valve 20 and supplied into the each cylinder 16 of the internal combustion engine 11. In this embodiment, the drive control of the each fuel injection valve 20 that is based on the requested injection timing Tst and the requested injection time Ttm functions to correspond to basic injection control.

In the fuel injection control of this embodiment, when the engine speed NE falls within a prescribed speed range due to deceleration of the traveling speed of the vehicle 10 and the engine speed NE that is caused by cancellation of the operation of the accelerator operating member (the accelerator operation amount ACC="0"), control for temporarily stopping the fuel injection for the operation of the internal combustion engine 11 (so-called fuel cut control) is executed.

In addition, in the fuel injection control of this embodiment, three areas in which the cetane number of the fuel is low (a low cetane number area), medium (a medium cetane number area), and high (a high cetane number area) are set, and the fuel injection control is executed in an execution mode that varies by the area. For example, the requested injection timing Tst is set to an advance side when the cetane number is in the low area. More specifically, for each of the three cetane number areas, a relationship between the engine operation state that is determined by the requested injection amount TAU and the engine speed NE and the requested injection timing Tst is suitable for the cetane number area is obtained in advance through various experiment and simulation results, and such relationships are stored as computation maps (ML, MM, MH) in the electronic control unit 40. Then, based on the requested injection amount TAU and the engine speed NE at the time, the requested injection timing Tst is calculated from the computation map ML when in the low cetane number area, from the computation map MM when in the medium cetane number area, and from the computation map MH when in the high cetane number area When the fuel injection from the fuel injection valve 20 is executed as described above, an error occurs in the execution timing or the injection amount due to an initial individual difference, aging, or the like of the fuel injection valve 20. Such an error is undesirable because it can change output torque of the internal combustion engine 11. Thus, in this embodiment, in order to appropriately execute the fuel injection from each of the fuel injection valves 20 that corresponds to the operation state of the internal combustion engine 11, a detection time waveform of a fuel injection rate is formed on the basis of the fuel pressure PQ that is detected by the pressure sensor 41, and the correction process is executed to correct the requested injection timing Tst and the requested injection time Ttm on the basis of the detection time waveform. The correction process is executed for the each cylinder 16 in the internal combustion engine 11.

The fuel pressure in the fuel injection valve 20 fluctuates along with the opening/closing operation of the fuel injection valve 20 such that it is lowered when the fuel injection valve 20 is opened and is increased thereafter when the fuel injection valve 20 is closed. Accordingly, it is possible to accurately grasp an actual operation property of the fuel injection valve 20 (such as the actual fuel injection amount, initiation timing of the valve opening operation, initiation timing of the valve closing operation, for example) by monitoring a fluctuation waveform of the fuel pressure in the fuel injection valve 20 during the execution of the fuel injection. Therefore, it is possible to accurately set the fuel injection timing and the fuel injection amount that correspond to the operation state of the internal combustion engine 11 by correcting the requested injection timing Tst and the requested injection time Ttm on the basis of the actual operation property of the fuel injection valve 20, just as described.

The correction process as described above will be described below in detail.

First, a description will be made on a procedure to create a fluctuation mode of the fuel pressure (the detection time waveform of the fuel injection rate in this embodiment) during the execution of the fuel injection.

Figure 3:
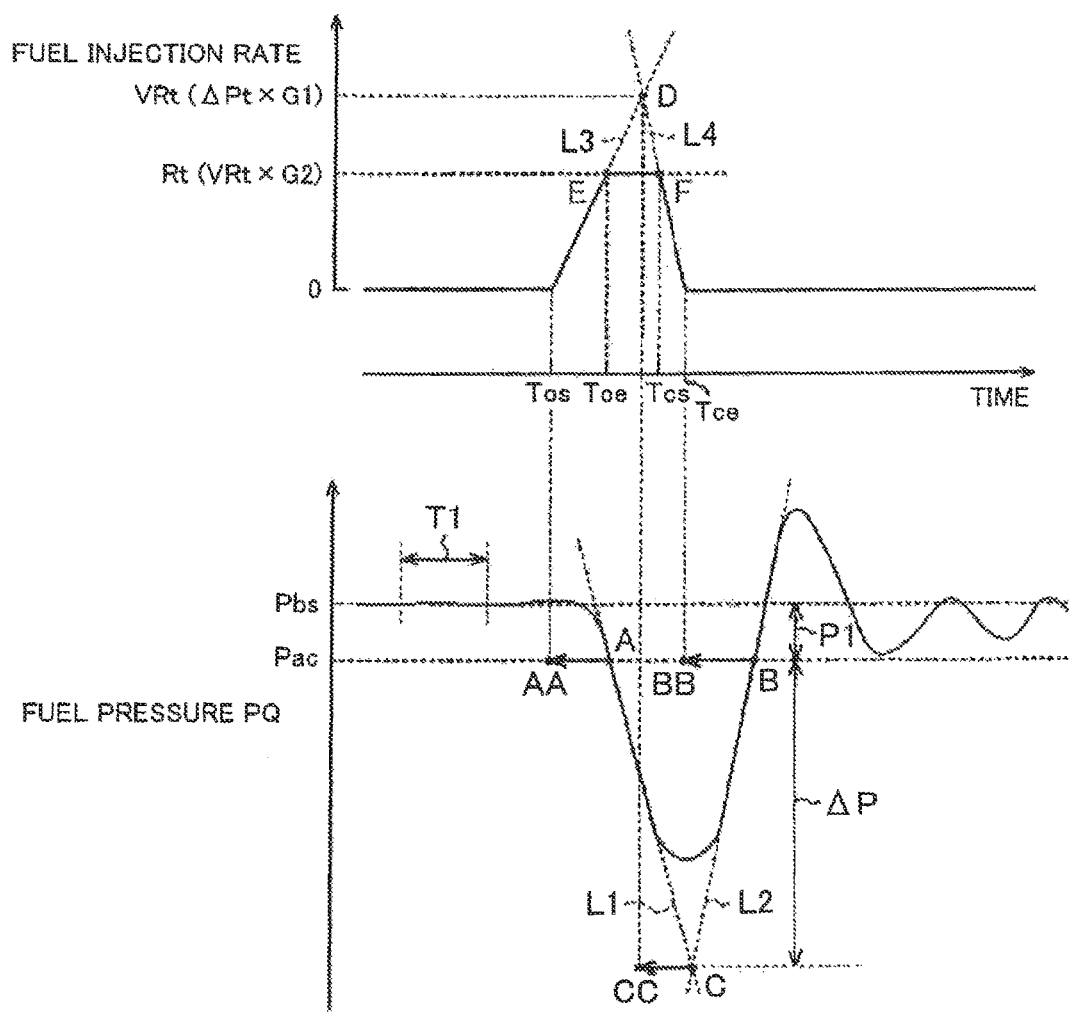
FIG. 3 is a time chart for showing a relationship between transition of fuel pressure and a detection time waveform of a fuel injection rate.

FIG. 3 shows a relationship between the transition of the fuel pressure PQ and the detection time waveform of the fuel injection rate.

As shown in FIG. 3, the initiation timing of the valve opening operation (valve opening operation initiation timing Tos) of the fuel injection valve 20 (more specifically, movement of the needle valve 22 to a valve opening side), timing at which the fuel injection rate reaches the maximum (maximum injection rate reaching timing Toe), timing at which the fuel injection rate starts declining (injection rate decline initiation timing Tcs), and timing at which the valve closing operation of the fuel injection valve 20 (more specifically, movement of the needle valve 22 to a valve closing side) is completed (valve closing operation completion timing Tce) are detected in this embodiment.

First, an average value of the fuel pressure PQ in a prescribed period T1 that is immediately before the valve opening operation of the fuel injection valve 20 is initiated is calculated, and the average value is stored as reference pressure Pbs. The reference pressure Pbs is used as pressure that corresponds to the fuel pressure in the fuel injection valve 20 when the valve is closed.

Next, a value obtained by subtracting prescribed pressure P1 from the reference pressure Pbs is calculated as operation pressure Pac (=Pbse−P1). The prescribed pressure P1 corresponds to a change in the fuel pressure PQ that is produced by valve opening drive or valve closing drive of the fuel injection valve 20 regardless of the needle valve 22 being in a valve closing position, that is, a change in the fuel pressure PQ that does not contribute to the movement of the needle valve 22.

Then, a first order differential value d(PQ)/dt of the fuel pressure PQ by time is calculated for a period that the fuel pressure PQ declines immediately after the initiation of the fuel injection. Next, a tangent L1 of a time waveform of the fuel pressure PQ at a point at which the first order differential value is the smallest, that is, a point at which a downward gradient of the fuel pressure PQ is the steepest is calculated, and an intersection A between the tangent L1 and the operation pressure Pac is calculated. Timing that corresponds to a point AA at which the intersection A is moved backward in time for a detection delay of the fuel pressure PQ, which will be described below, is identified as the valve opening operation initiation timing Tos. It should be noted that the detection delay corresponds to a period for a delay in timing of the change in the fuel pressure PQ with respect to pressure change timing of the nozzle chamber 25 (see FIG. 2) in the fuel injection valve 20 and is a delay that is caused by a distance between the nozzle chamber 25 and the pressure sensor 41, or the like.

In addition, a first order differential value of the fuel pressure PQ is calculated for a period in which the fuel pressure PQ is declined and then increased immediately after the initiation of the fuel injection. Then, a tangent L2 of the time waveform of the fuel pressure PQ at a point at which the first order differential value is the largest, that is, a point at which an upward gradient of the fuel pressure PQ is the steepest is calculated, and an intersection B between the tangent L2 and the operation pressure Pac is calculated. Timing that corresponds to a point BB at which the intersection B is moved backward in time for the detection delay is identified as the valve closing operation completion timing Tee.

Furthermore, an intersection C between the tangent L1 and the tangent L2 is calculated, and a difference between the fuel pressure PQ and the operation pressure Pac at the intersection C (virtual pressure decline ΔP [=Pac−PQ]) is calculated. A virtual maximum fuel injection rate VRt (=ΔP× G1) is calculated by multiplying the virtual pressure decline ΔP by a gain G1 that is set on the basis of the requested injection amount TAU. Moreover, a maximum injection rate Rt (=VRt×G2) is calculated by multiplying the virtual maximum fuel injection rate VRt by a gain G2 that is set on the basis of the requested injection amount TAU.

Then, timing CC at which the intersection C is moved backward in time for the detection delay is calculated, and a point D at which the virtual maximum fuel injection rate VRt is obtained at the timing CC is identified. Timing that corresponds to an intersection F between the maximum injection rate Rt and a linear line L3 for connecting the point D and the valve opening operation initiation timing Tos (more specifically, a point at which the fuel injection rate becomes "0" at the timing Tos) is identified as the maximum injection rate reaching timing Toe.

In addition, timing that corresponds to an intersection F between the maximum injection rate Rt and a linear line L4 for connecting the point D and the valve closing operation completion timing Tee (more specifically, a point at which the fuel injection rate becomes "0" at the timing Tce) is identified as the injection rate decline initiation timing Tcs.

Furthermore, the time waveform in a trapezoidal shape that is formed by the valve opening operation initiation timing Tos, the maximum injection rate reaching timing Toe, the injection rate decline initiation timing Tcs, the valve closing operation completion timing Tce, and the maximum injection rate Rt is used as the detection time waveform of the fuel injection rate in the fuel injection.

Next, with reference to FIG. 4 and FIG. 5, a detailed description will be made on a processing procedure of the process (the correction process) to correct the various control target values of the fuel injection control on the basis of the detection time waveform.

Figure 4:
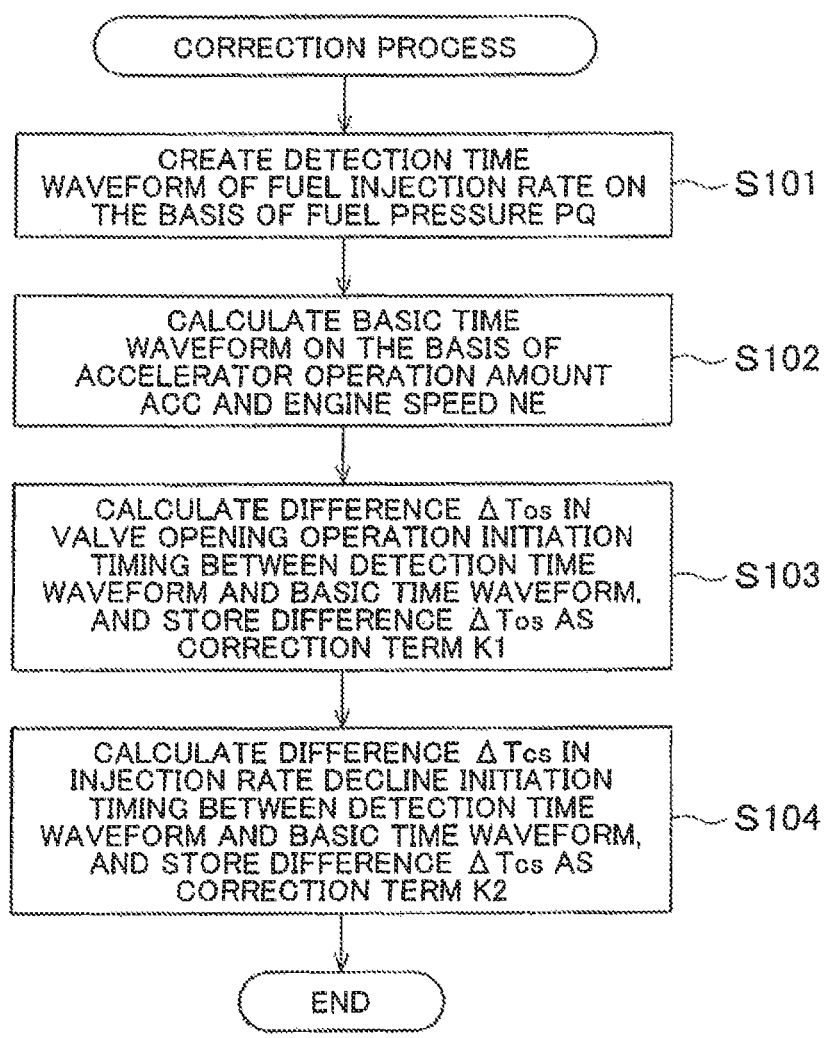
FIG. 4 is a flowchart for showing an execution procedure of a correction process.

FIG. 4 is a flowchart for showing a specific processing procedure of the correction process. A series of process steps shown in the flowchart conceptually show an execution procedure of the correction process, and the actual process is executed by the electronic control unit 40 as an interruption process for each prescribed cycle. In addition, FIG. 5 shows an example of a relationship between the detection time waveform and the basic time waveform, which will be described below.

As shown in FIG. 4, in the correction process, the detection time waveform during the execution of the fuel injection is first created on the basis of the fuel pressure PQ as described above (a step S101). Then, based on the operation state of the internal combustion engine 11 such as the accelerator operation amount ACC and the engine speed NE, a basic value for the time waveform (the basic time waveform) of the fuel injection rate during the execution of the fuel injection is set (a step S102). In this embodiment, a relationship between the operation state of the internal combustion engine 11 and the basic time waveform suitable for the operation state is obtained in advance from the experiment or simulation result and stored in the electronic control unit 40. In the process of the step S102, the basic time waveform is set from the above relationship on the basis of the operation state of the internal combustion engine 11 at the time.

Figure 5:
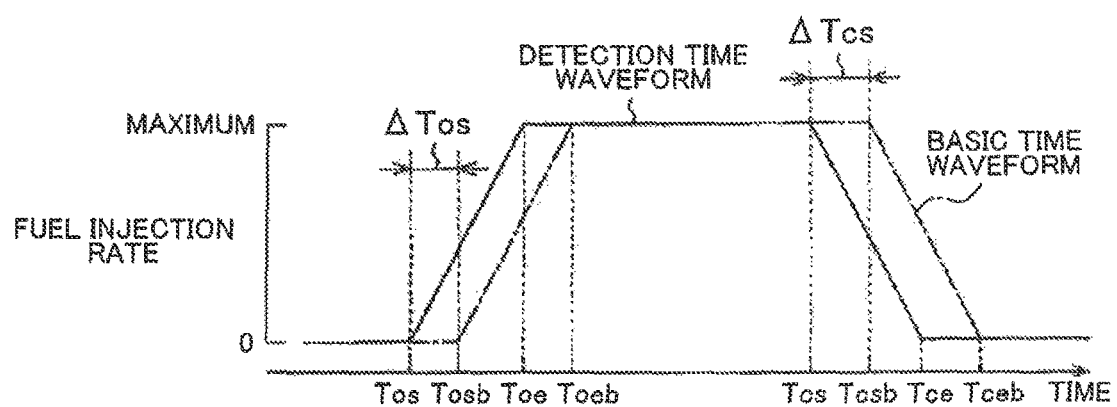
FIG. 5 is a time chart for showing an example of a relationship between the detection time waveform and a basic time waveform.

As shown in FIG. 5, as the above basic time waveform (a dashed line), a trapezoidal time waveform is set that is defined by a valve opening operation initiation timing Tosb, a maximum injection rate reaching timing Toeb, an injection rate decline initiation timing Tcsb, a valve closing operation completion timing Tceb, and a maximum injection rate.

The basic time waveform and the detection time waveform (a solid line) are then compared, and based on a comparison result, a correction term K1 for correcting the control target value (the requested injection timing Tst) at the initiation timing of the fuel injection and a correction term K2 for correcting the control target value (the requested injection time Ttm) during the execution of the fuel injection are calculated. More specifically, a difference ΔTos (=Tosb−Tos) between the valve opening operation initiation timing Tosb in the basic time waveform and the valve opening operation initiation timing Tos in the detection time waveform is calculated, and the difference ΔTos is stored as the correction term K1 (a step S103 in FIG. 4). In addition, a difference ΔTcs (=Tcsb−Tcs) between the injection rate decline initiation timing Tcsb in the basic time waveform (FIG. 5) and the injection rate decline initiation timing Tcs in the detection time waveform is calculated, and the difference ΔTcs is stored as the correction term K2 (a step S104 in FIG. 4).

After, each of the correction terms K1, K2 is calculated as described above, the process is terminated.

For execution of the fuel injection control, a value in which the requested injection timing Tst is corrected by the correction term K1 (in this embodiment, a value in which the correction term K1 is added to the requested injection timing Tst) is calculated as the final requested injection timing Tst. Because the difference between the valve opening operation initiation timing Tosb in the basic time waveform and the valve opening operation initiation timing Tos in the detection time waveform can be suppressed in a small degree by calculating the requested injection timing Tst as described above, it is possible to accurately set the initiation timing of the fuel injection that corresponds to the operation state of the internal combustion engine 11.

In addition, a value in which the requested injection time Ttm is corrected by the correction term K2 (in this embodiment, as value in which the correction term K2 is added to the requested injection time Ttm) is calculated as the final requested injection time Ttm. Because the difference between the injection rate decline initiation timing Tcsb in the basic time waveform and the injection rate decline initiation timing Tcs in the detection time waveform can be suppressed in the small degree by calculating the requested injection time Ttm as described above, it is possible to accurately set the timing at which the fuel injection rate starts declining during the execution of the fuel injection and that corresponds to the operation state of the internal combustion engine 11.

As described above, in this embodiment, because the requested injection timing Tst and the requested injection time Ttm are corrected on the basis of a difference between the actual operation property of the fuel injection valve 20 (more specifically, the detection time waveform) and the predetermined basic operation property (more specifically, the basic time waveform), it is possible to suppress a difference between the actual operation property and the basic operation property (the operation property of the fuel injection valve with a standard property) of the fuel injection valve 20. Thus, the injection timing and the injection amount of the each fuel injection valve 20 during the execution of the fuel injection can appropriately be set to correspond to the operation state of the internal combustion engine 11.

In this embodiment, control (the index value detection process) is executed to detect the cetane number index value of the fuel that is combusted in the internal combustion engine 11. The overview of the index value detection process will be described below In the index value detection process, execution conditions that include a condition in which the above-described fuel cut control is executed ([Condition 1] which will be described below) are set. When the execution conditions are met, the fuel injection to the internal combustion engine 11 is executed with a predetermined prescribed small amount FQ (several cubic millimeters, for example), and an index value of the output torque of the internal combustion engine 11 (a rotation variation amount ΣΔNE, which will be described below) that is generated along with the execution of the fuel injection is detected as the cetane number index value of the fuel. A larger value is detected for the rotation variation amount ΣΔNE when the larger output torque is generated in the internal combustion engine 11.

When the cetane number of the fuel that is supplied to the internal combustion engine 11 is large, the fuel is more easily ignited, and an amount of the remaining fuel to be combusted is reduced; therefore, engine torque that is generated along with the combustion of the fuel is increased. In estimation control of this embodiment, the cetane number index value of the fuel is detected on the basis of such a relationship between the cetane number of the fuel and the output torque of the internal combustion engine 11.

A detailed description will hereinafter be made on an execution procedure of the index value detection process.

FIG. 6 is a flowchart for showing a specific execution procedure of the above index value detection process. A series of process steps shown in the flowchart conceptually show the execution procedure of the index value detection process, and the actual process is executed by the electronic control unit 40 as the interruption process for each prescribed cycle.

As shown in FIG. 6, it is first determined in this process whether or not the execution conditions are met (a step S201). Here, it is determined that the execution conditions are met if following [Condition 1] to [Condition 3] are all met.

[Condition 1] The fuel cut control is executed.
[Condition 2] The clutch mechanism 13 operatively disconnects the crankshaft 12 from the manual transmission 14. More specifically, the clutch operating member is operated.
[Condition 3] The correction process is appropriately executed. More specifically, each of the correction terms K1, K2 calculated in the correction process arc neither upper limit values nor lower limited values.

If the execution conditions are not met (the step S201: NO), the following process steps, that is, the process steps for detecting the cetane number index value of the fuel are not executed, and the process is terminated.

If the execution conditions are met after the process step is repeatedly executed (the step S201: YES), the execution of the process for detecting the cetane number index value of the fuel is initiated, More specifically, the predetermined control target value of the fuel injection timing (a target injection timing TQst) and the predetermined control target value of the fuel injection time (a target injection time TQtm) are first corrected by the correction terms K1, K2 that have been calculated in the above-described correction process in FIG. 4 and FIG. 5 (a step S202 of FIG. 6). In detail, a value in which the correction term K1 is added to the target injection timing TQst is set as the new target injection timing TQst, and a value in which the correction term K2 is added to the target injection time TQtm is set as the new target injection time TQtm.

Then, the drive control of the fuel injection valve 20 that is based on the target injection timing TQst and the target injection time TQtm is executed, and the fuel injection from the fuel injection valve 20 is executed (a step S203). Through such drive control of the fuel injection valve 20, the prescribed amount FQ of the fuel is injected from the fuel injection valve 20 at the timing to suppress variation in the rotation variation amount ΣΔNE. In this embodiment, the fuel injection in the process of the step S203 is executed by using predetermined one of the plural fuel injection valves 20 (in this embodiment, the fuel injection valve 20 that is attached to a cylinder 16[#1]). Also, values that is calculated to correspond to the predetermined one of the fuel injection valves 20 (in this embodiment, the fuel injection valve 20 that is attached to the cylinder 16[#1]) are used as the correction terms K1, K2 used in this process. In this embodiment, the drive control of the fuel injection valve 20 that is based on the target injection timing TQst and the target injection time TQtm in the process of the step S203 functions to correspond to auxiliary injection control.

Figure 7:
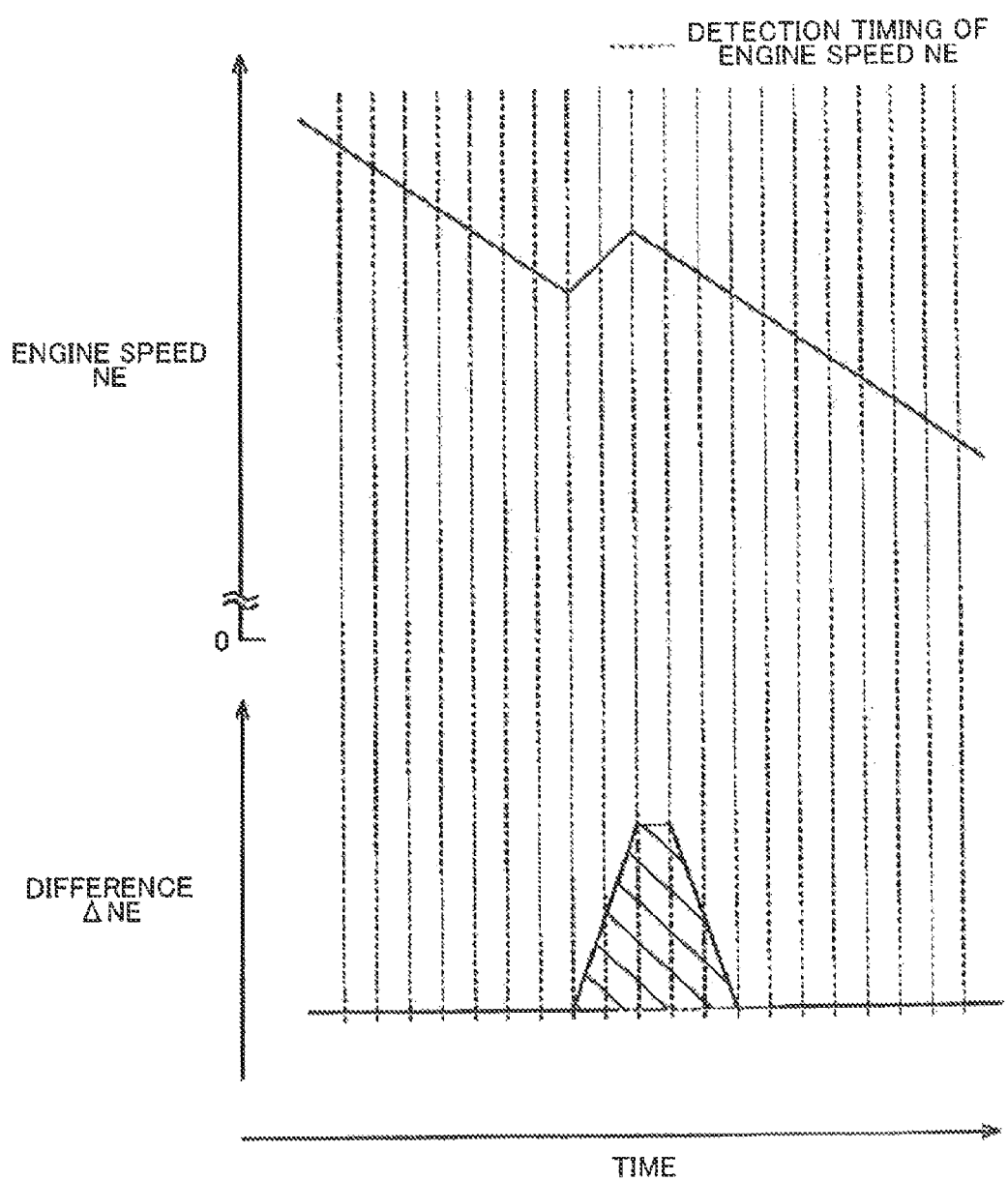
FIG. 7 is a graph for illustrating a method of calculating a rotation variation amount.

Next, after the rotation variation amount ΣΔNE is detected and stored as an index value of the output torque of the internal combustion engine 11 that is generated along with the fuel injection of the prescribed amount FQ (a step S204), the process is terminated. The rotation variation amount ΣΔNE is specifically detected as follows. As shown in FIG. 7, in the apparatus according to this embodiment, the engine speed NE is detected at each prescribed time, and a difference ΔNE (=NE−NEi) between the engine speed NE and the engine speed NEi that is detected several times before (in this embodiment, three times before) is calculated for each detection. Then, an integrated value of the change in the difference ΔNE that is generated by the execution of the fuel injection (a value corresponding to a shaded area in FIG. 7) is calculated, and the integrated value is stored as the rotation variation amount ΣΔNE. Because transitions of the engine speed NE and the difference ΣΔNE shown are simplified in FIG. 7 to promote understanding of the method of calculating the rotation variation amount ΣΔNE, they are slightly different from the actual transitions.

In this embodiment, basically, one of the low cetane number area the medium cetane number area, and the high cetane number area is identified on the basis of the rotation variation amount ΣΔNE that is detected through the index value detection process, and the identified area is stored in the electronic control unit 40. More specifically, it is determined to be in the low cetane number area when the rotation variation amount ΣΔNE is smaller than a prescribed value PL (ΣΔNE<PL), it is determined to be in the medium cetane number area when the rotation variation amount ΣΔNE is the prescribed value PL or larger and smaller than a prescribed value PH (PL≤ΣΔNE<PH), and it is determined to be in the high cetane number area when the rotation variation amount ΣΔNE is the prescribed value PH or larger (ΣΔNE≥PH). Then, the fuel injection control is executed in the execution mode suitable for the thus-identified cetane number area.

Here, in this embodiment, the fuel injection is executed to detect the cetane number index value of the fuel only when the above-described execution conditions are met; therefore, even if the fuel is fed and the cetane number of the fuel in the fuel tank 32 is changed, the cetane number of the fuel remains not to be unestimated as long as the execution conditions are not met.

In this case, if it is determined to be in the high cetane number area before the fuel feed and the fuel with the relatively small cetane number is fed, the fuel injection control is executed in the execution mode suitable for the high cetane number area despite the fact that the cetane number of the fuel in the fuel tank 32 is lowered and that the cetane number of the fuel supplied to the internal combustion engine 11 is thus lowered. In this case, not only the combustion state of the fuel in the cylinder 16 of the internal combustion engine 11 is degraded, but also this results in occurrence of a misfire.

In this embodiment, because [Condition 1] is included in the above execution conditions, the cetane number index value of the fuel is only detected during the execution of the fuel cut control, that is, in a limited circumstance where the engine speed NE falls within the prescribed speed range during deceleration of the traveling speed of the vehicle 10 and the engine speed NE. Accordingly, there is a case where the execution conditions are not met for a long time, such as a case where the internal combustion engine 11 is started after the fuel feed and remains in an idling operation state or a case where a high-speed travel continues immediately after the fuel feed on an expressway, and an a degree of influence on the occurrence of the misfire that is caused by the fuel feed with the low cetane number is likely to be significant.

Considering such a circumstance, in this embodiment, when the fuel is fed into the fuel tank 32, the cetane number index value of the fuel in the fuel tank 32 after the fuel feed (more specifically, a value corresponding to the rotation variation amount ΣΔNE) in a case where the fuel with the lowest cetane number among fuel that is possibly fed into the fuel tank 32 is fed is calculated as a temporary index value VS. Then, the process of identifying the cetane number area is executed by using the temporary index value VS as an identification parameter instead of using the rotation variation amount ΣΔNE that is stored in the electronic control unit 40 as the identification parameter. The fuel with the lowest cetane number among fuel that is possibly fed into the fuel tank 32 may be determined in consideration of all types of fuel that are distributed in a region where the vehicle 10 is expected to run or may be determined in consideration of all types of fuel that are distributed in all regions. In this embodiment, the temporary index value VS functions as a temporary fuel estimated property.

Accordingly, even when the cetane number of the fuel in the fuel tank 32 is lowered by the fuel feed, it is possible to avoid a situation where the rotation variation amount ΣΔNE that is calculated and stored before the fuel feed, that is, a value that indicates the relatively high cetane number is used for the fuel injection control. As described above, in this embodiment, when the fuel is fed into the fuel tank 32, compared to the first execution mode that corresponds to the rotation variation amount ΣΔNE stored in the electronic control unit 40, the fuel injection control is executed in the second execution mode that is based on the temporary index value VS, that is, the execution mode in which the stable operation of the internal combustion engine 11 is given more importance. Therefore, despite the fact that the cetane number of the fuel that is supplied to the internal combustion engine 11 is changed immediately after the fuel feed, it is possible to prevent the operation state of the internal combustion engine 11 from becoming unstable through the execution of the fuel injection control that is based on the temporary index value VS.

The fuel injection control is executed on the basis of the temporary index value VS, that is, the cetane number index value, of the fuel in the fuel tank 32 after the fuel feed in the case where the fuel with the lowest cetane number among fuel that is possibly fed into the fuel tank 32 is fed. Accordingly, when the fuel is fed into the fuel tank 32, the fuel injection control can be executed under an assumption that the fuel with the same cetane number as or the lower cetane number than the cetane number of the fuel that is actually supplied to the internal combustion engine 11 is supplied to the internal combustion engine 11. In this case, because the combustion state of the fuel in the internal combustion engine 11 is never degraded but is only improved when compared to the estimated combustion state, the occurrence of the misfire that is caused by degradation of the combustion state can favorably be prevented. Therefore, even when the fuel with the low cetane number is fed into the fuel tank 32, it is possible to prevent the occurrence of the misfire that can be caused by the fuel feed.

A detailed description will hereinafter be made on a process of calculating the temporary index value VS and a process of executing the fuel injection control based on the temporary index value VS.

A description is first made on the process of calculating the temporary index value VS (the temporary index value calculation process).

Figure 8:
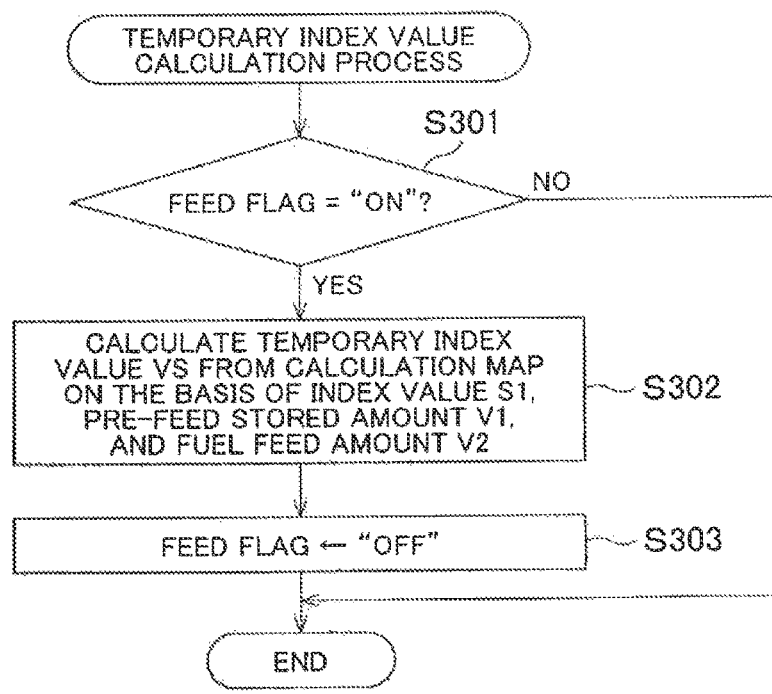
FIG. 8 is a flowchart for showing an execution procedure of a temporary index value calculation process.

FIG. 8 shows an execution procedure of the above temporary index value calculation process. A series of process steps shown in the flowchart of the drawing are executed by the electronic control unit 40 as the interruption process for each prescribed cycle.

As shown in FIG. 8, it is first determined in this process whether or not a feed flag is turned ON (a step S301). The feed flag is a flag that is turned ON when it is determined that the fuel is fed into the fuel tank 32 and that is turned OFF when calculation of the temporary index value VS is completed. That the fuel is fed into the fuel tank 32 is determined as follows. In this embodiment, the stored fuel amount SP that is detected by the stored amount sensor 46 during an OFF operation of the operation switch 47 is stored as a fuel amount that is stored in the fuel tank 32 at the initiation of the fuel feed (a pre-feed stored amount V1). In addition, the stored fuel amount SP that is detected by the stored amount sensor 46 during an ON operation of the operation switch 47 is used as a fuel amount that is stored in the fuel tank 32 after the fuel feed (a post-feed stored amount VP). Then, during the ON operation of the operation switch 47, an amount of the fuel that is fed into the fuel tank 32 (a fuel feed amount V2[=VP−V1]) and a stored amount change rate RP (=VP/V1) are calculated from the pre-feed stored amount V1 and the post-feed stored amount VP. It is determined that the fuel is fed when the fuel feed amount V2 is a prescribed amount or larger or when the stored amount change rate RP is a prescribed value or higher.

Next, if it is determined that the feed flag is turned ON (the step S301: YES), the process of calculating the temporary index value VS is executed (a step S302). In this process, the rotation variation amount ΣΔNE that is stored during the ON operation of the operation switch 47 is used as an index value S1 of the cetane number of the fuel that is stored in the fuel tank 32 before the fuel feed. Then, based on the index value S1, an amount of the fuel stored in the fuel tank 32 at the initiation of the fuel feed (the pre-feed stored amount V1), an amount of the fuel that is fed into the fuel tank 32 (the fuel feed amount V2), and a predetermined prescribed cetane number index value S2, a value that satisfies a following relational equation is calculated as the temporary index value VS.

$$VS=(V1 \times S1+V2 \times S2)/(V1+V2)$$

Figure 9:
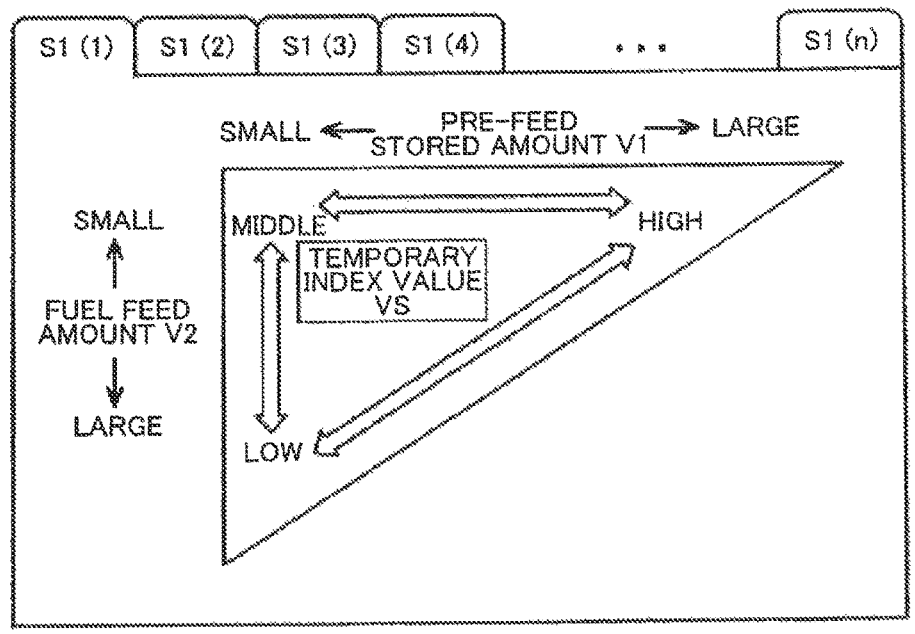
FIG. 9 is a schematic view for showing a map structure of a computation map that is used for calculation of a temporary index value.

More specifically, a relationship among the pre-feed stored amount V1, the fuel feed amount V2, and the temporary index value VS as shown in FIG. 9 is defined for the each index value S1 and stored in the electronic control unit 40, and the temporary index value VS is calculated from these relationships (a computation map). It should be noted that the prescribed cetane number index value S2 is an index value of the lowest cetane number among the cetane numbers of fuel that is possibly fed into the fuel tank 32 (more specifically, a value corresponding to the rotation variation amount ΣΔNE).

When the temporary index value VS is calculated as described above (a step S302), the feed flag is turned OFF (a step S303), and the process is terminated. Unless the feed flag is turned ON thereafter in a state that the fuel is fed into the fuel tank 32 (the step S301: NO), the temporary index value VS will not be calculated.

Because the temporary index value VS is calculated as described above, the cetane number of the fuel in the fuel tank 32 after the fuel feed can be estimated under an assumption that the cetane number of the fuel fed into the fuel tank 32 corresponds to the prescribed value. Accordingly, it is possible to by defining an appropriate value as the above prescribed value calculate a lower limit index value within a variation range of the cetane number of the fuel in the fuel tank 32 after the fuel feed as the temporary index value VS. In this embodiment, the index value of the lowest cetane number (a worst fuel property) among the cetane numbers of fuel that is possibly fed into the fuel tank 32 is adopted as the prescribed cetane number index value S2. Thus, as the temporary index value VS, it is possible to calculate a value that corresponds to the cetane number of the fuel in the fuel tank 32 after the fuel feed in the case where the fuel with the lowest cetane number among fuel that is possibly fed into the fuel tank 32 is fed. Therefore, based on the temporary index value VS, it is possible to grasp a degree of possible reduction in the cetane number of the fuel in the fuel tank 32 after the fuel feed.

Meanwhile, in a case where the rotation variation amount $\Sigma\Delta NE$ is newly calculated immediately after the feeding of the fuel into the fuel tank 32, if the combustion control that corresponds to the rotation variation amount $\Sigma\Delta NE$ is executed under an assumption that the rotation variation amount $\Sigma\Delta NE$ corresponds to the actual cetane number of the fuel, following inconvenience may occur.

When the cetane number of the stored fuel in the fuel tank 32 is changed due to the fuel feed, the cetane number of the fuel in the fuel pipe (more specifically, the branch passage 31a, the common rail 34, and the supply passage 31b), that is, the cetane number of the fuel to be supplied to the internal combustion engine 11 is gradually changed from the cetane number of the stored fuel before the fuel feed to the cetane number of the stored fuel after the fuel feed. Accordingly, even when the rotation variation amount $\Sigma\Delta NE$ is newly calculated and stored in a period that the cetane number of the fuel supplied to the internal combustion engine 11 is changed due to the fuel feed (hereinafter a mixing period), a difference between the rotation variation amount $\Sigma\Delta NE$ stored in the electronic control unit 40 and a value that corresponds to the actual cetane number is likely to be generated by the change in the cetane number after the period.

If the fuel injection control according to the rotation variation amount $\Sigma\Delta NE$ calculated in the mixing period is executed, the combustion state of the fuel is degraded depending on a direction or a magnitude of the difference, and the operation state of the internal combustion engine 11 may become unstable. More specifically, when the cetane number area that is identified by the rotation variation amount $\Sigma\Delta NE$ stored in the electronic control unit 40 is the higher cetane number area than that corresponding to the actual the cetane number, the fuel injection control is executed in the execution mode that corresponds to the higher cetane number than the actual cetane number; therefore, the combustion state of the fuel may become unstable.

Considering such a circumstance, in this embodiment, when the rotation variation amount $\Sigma\Delta NE$ is newly calculated and stored through the index value detection process (see FIG. 6) in the above mixing period, the fuel injection control is executed while restricting the reflection of the stored rotation variation amount $\Sigma\Delta NE$ to the fuel injection control. In other words, the execution mode of the fuel injection control is not simply switched to the execution mode that corresponds to the rotation variation amount $\Sigma\Delta NE$ that is calculated at this time, but the fuel injection control is executed in the execution mode in which the stable operation of the internal combustion engine 11 is given more importance while restricting the reflection of the rotation variation amount $\Sigma\Delta NE$. Accordingly, it is possible to prevent the unstable engine operation state due to switching of the execution mode of the fuel injection control to the execution mode that corresponds to the rotation variation amount $\Sigma\Delta NE$ calculated in the above mixing period. Therefore, it is possible to realize the stable engine operation immediately after the fuel feed into the fuel tank 32.

A description will hereinafter be made on a process of identifying the cetane number area that is used for the fuel injection control (the cetane number area identification process).

Figure 10:
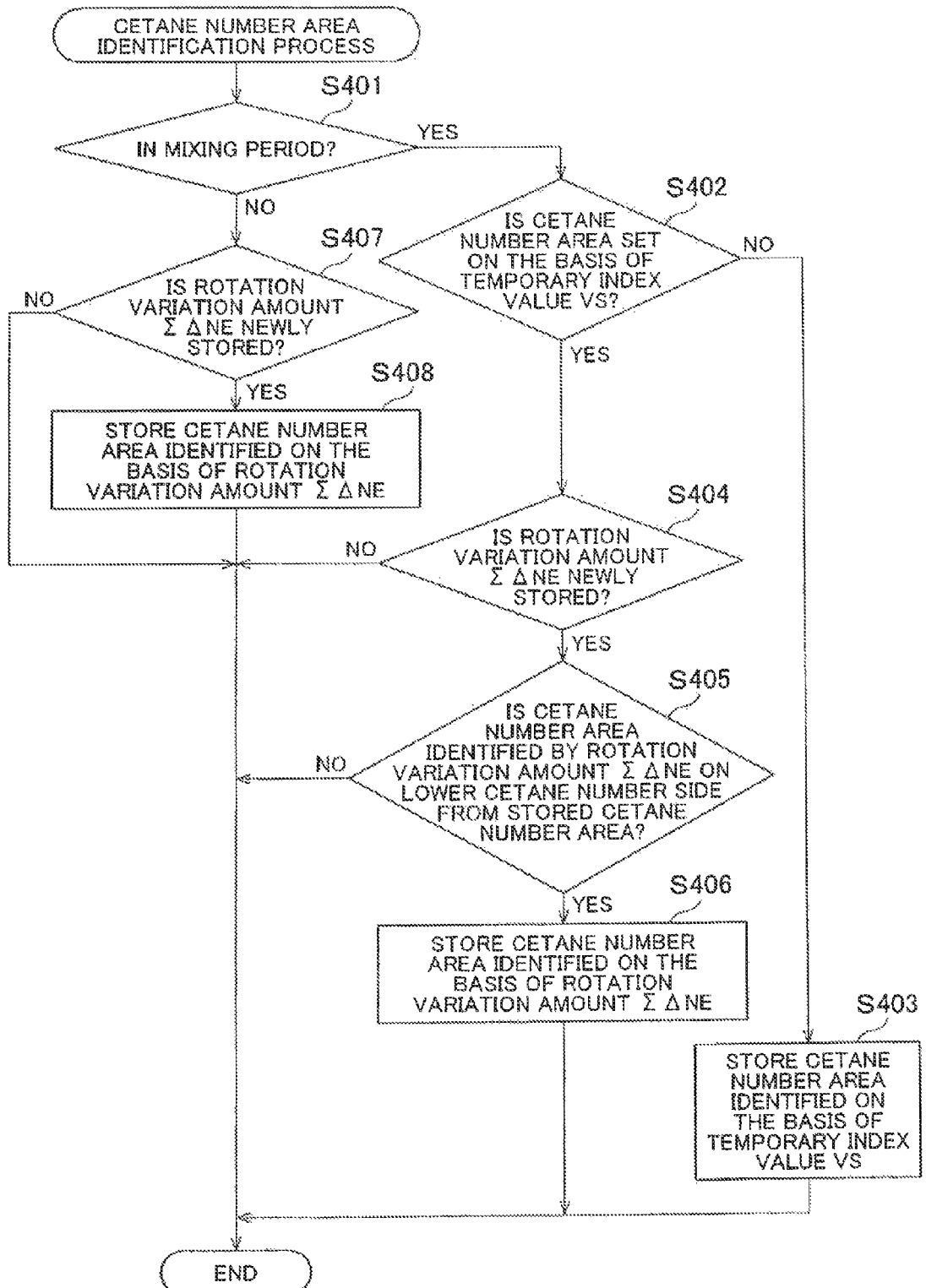
FIG. 10 is a flowchart for showing an execution procedure of a cetane number area identification process.

FIG. 10 shows an execution procedure of the cetane number area identification process. A series of process steps shown in the flowchart of the drawing are executed by the electronic control unit 40 as the interruption process for each prescribed cycle.

As shown in FIG. 10, in this process, it is first determined whether or not it is in the mixing period, that is, a period in which the cetane number of the fuel supplied to the internal combustion engine 11 is changed due to the feeding of the fuel into the fuel tank 32 (a step S401). More specifically, it is determined to be in the mixing period if an integrated value $\Sigma Q$ of the fuel injection amount after the feeding of the fuel into the fuel tank 32 is smaller than a prescribed amount, In this embodiment, a fuel consumption amount is calculated in advance on the basis of the experiment or simulation result such that the entire fuel in the fuel pipe (more specifically, the branch passage 31a, the common rail 34, and the supply passage 31b) for supplying the fuel in the fuel tank 32 to the internal combustion engine 11 is replaced by the fuel that is pressure-fed from the fuel tank 32 to the fuel pipe after the fuel feed. The fuel consumption amount is then stored as the above prescribed amount in the electronic control unit 40. As described above, in this embodiment, a period until the fuel in the fuel pipe is replaced by the fuel that is pressure-fed from the fuel tank 32 to the fuel pipe after the fuel feed corresponds to the mixing period.

Then, if the fuel is fed into the fuel tank 32 and it is in the mixing period (the step S401: YES), and if the cetane number area is not identified or stored on the basis of the temporary index value VS at this time (a step S402: NO), the identification and storage thereof are executed (a step S403). In the process in the step S403, it is determined to be in the low cetane number area if the temporary index value VS is smaller than the prescribed value PL (VS<PL), it is determined to be in the medium cetane number area if the temporary index value VS is the prescribed value PL or larger and is smaller than the prescribed value PH (PL≤VS<PH), and it is determined to be in the high cetane number area if the temporary index value VS is the prescribed value PH or larger (VS≥PH). In this embodiment, the fuel injection control is executed in the execution mode that corresponds to the thus-identified cetane number area.

After the cetane number area is identified as described above (the step S401: YES and the step S402: YES), it is determined whether or not the rotation variation amount $\Sigma\Delta NE$ is newly calculated and stored in a period from the last execution of the process to the current execution of the process (a step S404). If the rotation variation amount $\Sigma\Delta NE$ is not newly calculated or stored (the step S404: NO), the following process steps will not be executed, and the process is terminated.

If the above process step is repeatedly executed thereafter, and the rotation variation amount $\Sigma\Delta NE$ is newly calculated and stored (the step S404: YES), it is determined whether or not the cetane number area that is identified by the rotation variation amount $\Sigma\Delta NE$ is the area on the lower cetane number side from the cetane number area stored at this time (a step S405).

Then, if the cetane number area that is identified by the newly stored rotation variation amount $\Sigma\Delta NE$ is the area on the higher cetane number side from the cetane number area stored at this time or is the same area as the stored cetane number area (the step S405: NO), the cetane number area that is used for the fuel injection control is not updated (a process in a step S406 is skipped).

In this case, if it is assumed that the fuel injection control that corresponds to the cetane number area identified by the newly stored rotation variation amount $\Sigma\Delta NE$ is executed, the execution mode is changed to the execution mode that corresponds to the area on the higher cetane number side from the currently set cetane number area, and the combustion state of the fuel may be degraded. Therefore, the reflection of the rotation variation amount ΣΔNE to the fuel injection control is prohibited. More specifically, if the cetane number area that is identified by the newly stored rotation variation amount ENE is the area on the higher cetane number side from the cetane number area stored at this time, the stable operation of the internal combustion engine 11 is given more importance, and the reflection of the newly stored rotation variation amount ΣΔNE to the fuel injection control is prohibited, it should be noted that, if the cetane number area that is identified by the newly stored rotation variation amount ΣΔNE is the same as the cetane number area stored at this time, there is no necessity to change the cetane number area that is used for the fuel injection control.

On the other hand, if the cetane number area that is identified by the newly stored rotation variation amount ΣΔNE is the area on the lower wane number side from the cetane number area stored at this time (the step S405: YES), the cetane number area is identified on the basis of the newly stored rotation variation amount ΣΔNE, and this cetane number area is newly stored as the cetane number area that is used for the fuel injection control (the step S406).

In this case, if it is assumed that the fuel injection control that corresponds to the cetane number area identified by the newly stored rotation variation amount ΣΔNE is executed, the execution mode is changed to the execution mode that corresponds to the area on the lower cetane number side from the currently set cetane number area, and the combustion state of the fuel is improved. Therefore, the reflection of the rotation variation amount ΣΔNE to the fuel injection control is permitted. More specifically, if the cetane number area that is identified by the newly stored rotation variation amount ΣΔNE is the area on the lower cetane number side from the cetane number area stored at this time, the actual cetane number is possibly lower than the assumed cetane number; therefore, the stable operation of the internal combustion engine 11 is given more importance, and the reflection of the newly stored rotation variation amount ΣΔNE to the fuel injection control is permitted. In detail, in this process, it is determined to be in the low cetane number area if the rotation variation amount ΣΔNE is smaller than the prescribed value PL (ΣΔNE<PL), and it is determined to be in the medium cetane number area if the rotation variation amount ΣΔNE is the prescribed value PL or larger and is smaller than the prescribed value PH (PL≤ΣΔNE<PH). Then, in this embodiment, the fuel injection control is executed in the execution mode that corresponds to the thus-identified cetane number area.

As described above, according to this embodiment, if it is assumed that the rotation variation amount ΣΔNE newly calculated and stored in the mixing period is reflected to the fuel injection control through the process in the step S404 to the step S406, the rotation variation amount ΣΔNE can be reflected to the fuel injection control only in a condition that the improvement of the combustion state of the fuel can be expected. Accordingly, it is possible to favorably prevent the operation state of the internal combustion engine 11 from becoming unstable.

If this process step is repeatedly executed, and the mixing period elapses thereafter (the step S401: NO), it is determined whether or not the rotation variation amount ΣΔNE is newly calculated and stored in the period from the last execution of the process to the current execution of the process (a step S407). Then, if the rotation variation amount ΣΔNE is not newly calculated or stored (the step S407: NO), the following process will not be executed in the step S408, and the process is terminated.

If the rotation variation amount ΣΔNE is newly calculated and stored thereafter (the step S407: YES), the cetane number area is identified on the basis of the rotation variation amount ΣΔNE. After the cetane number area is newly stored as the cetane number area that is used for the fuel injection control (a step S408), the process is terminated.

As described above, in this embodiment, if the mixing period elapses after the fuel is fed into the fuel tank 32, the restriction to the reflection of the rotation variation amount ΣΔNE to the fuel injection control is canceled.

A description will hereinafter be made on actions that are achieved by the execution of each process (the index value detection process, the temporary index value calculation process, and the cetane number area identification process) with reference to a timing chart shown in FIG. 11.

Figure 11:
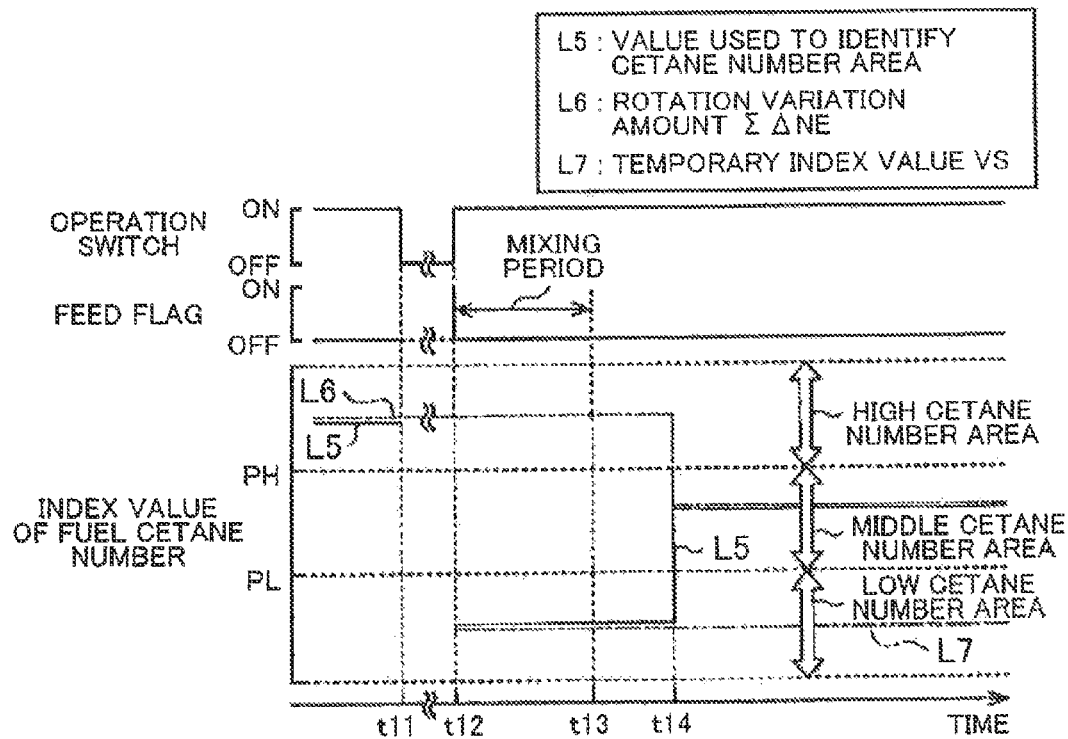
FIG. 11 is a timing chart for showing an example of an execution mode of each process.

In an example shown in FIG. 11, the fuel with the relatively high cetane number is stored in the fuel tank 32 before time t11. Thus, the fuel injection control is executed on the basis of the rotation variation amount ΣΔNE that is stored in the electronic control unit 40 (lines L5, L6 in the drawing), that is, a value indicative of the high cetane number. More specifically, the high cetane number area is identified on the basis of the rotation variation amount ΣΔNE, and the fuel injection control is executed in the execution mode that corresponds to the high cetane number area. In FIG. 11, the line L5 indicates the rotation variation amount ΣΔNE that is stored in the electronic control unit 40, and the line L6 indicates a value that is used to identify the cetane number area.

At the time t11, the operation switch 47 is turned OFF to terminate the operation of the internal combustion engine 11, and the fuel is fed into the fuel tank 32 during the termination of the operation (the time t11 to t12). At this time, the fuel with the relatively low cetane number is fed into the fuel tank 32. In this example, an average value of the cetane number of the fuel in the fuel tank 32 falls within the medium cetane number area due to the fuel feed.

Then, at the time t12, the operation switch 47 is turned ON to initiate the operation of the internal combustion engine 11, and the feed flag is turned ON because the fuel is fed into the fuel tank 32 during the termination of the operation of the internal combustion engine 11. Accordingly, the temporary index value VS (a line L7 in the drawing) is calculated, and the fuel injection control that is based on the temporary index value VS is initiated. More specifically, the low cetane number area is identified by the temporary index value VS and stored, and the fuel injection control is executed in the execution mode that corresponds to the low cetane number area.

At this time, the rotation variation amount ΣΔNE stored in the electronic control unit 40 is a value that corresponds to the cetane number of the fuel stored in the fuel tank 32 before the fuel feed. Thus, if the fuel injection control is executed on the basis of the rotation variation amount ΣΔNE, the fuel injection control is executed on the basis of the index value of the relatively high cetane number that is stored before the fuel feed (the rotation variation amount ΣΔNE indicated by the line L6 in the drawing) despite the fact that the cetane number of the fuel in the fuel tank 32 is lowered by the fuel feed. More specifically, despite the fact that the cetane number of the fuel in the fuel tank 32 falls within the medium cetane number area, the fuel injection control is executed in the execution mode that corresponds to the high cetane number area based on the rotation variation amount ΣΔNE at this time.

On the contrary, in the apparatus of this embodiment, the fuel injection control is executed on the basis of the temporary index value VS (the lines L5, L7 in the drawing), that is, the cetane number index value of the fuel in the fuel tank 32 after the fuel feed in a case where the fuel with the lowest cetane number among fuel that is possibly fed into the fuel tank 32 is fed. More specifically, the low cetane number area is identified on the basis of the temporary index value VS, and the fuel injection control is executed in the execution mode that corresponds to the low cetane number area.

Accordingly, when the cetane number of the fuel in the fuel tank 32 is lowered by the fuel feed, it is possible to avoid a situation where the fuel injection control is executed on the basis of the index value of the relatively high cetane number that is stored before the fuel feed (the rotation variation amount ΣΔNE). In this example, the fuel injection control is executed in the execution mode that corresponds to the low cetane number area on the lower cetane number side from the medium cetane number area within which the actual cetane number of the fuel in the fuel tank 32 falls. In the fuel injection control of this embodiment, as the execution mode that corresponds to each of the cetane number areas, the execution mode is set such that the combustion state of the fuel in the cylinder 16 of the internal combustion engine 11 becomes favorable when the cetane number area is on the lower cetane number side. Thus, in this case, because the combustion state of the fuel in the internal combustion engine 11 is not degraded but improved when compared to the assumed combustion state, it is possible to favorably prevent the occurrence of the misfire caused by the degradation of the combustion state. Therefore, even when the fuel with the low cetane number is fed into the fuel tank 32, it is possible to prevent the occurrence of the misfire due to the fuel feed.

When the fuel with the lowest cetane number, which is described above, is actually fed into the fuel tank 32, a value that is same as the cetane number index value of the fuel in the fuel tank 32 after the fuel feed is calculated as the temporary index value VS. Accordingly, when the fuel injection control is executed on the basis of the temporary index value VS, the fuel injection control is executed in the execution mode that corresponds to the same area as the cetane number area within which the actual cetane number of the fuel in the fuel tank 32 falls, and thus it is possible to prevent the occurrence of the misfire due to the fuel feed.

In addition, when the cetane number of the fuel stored in the fuel tank 32 is lowered by the fuel feed, the cetane number of the fuel supplied to the internal combustion engine 11 is gradually lowered. Thus, even if the rotation variation amount ΣΔNE is newly calculated and stored in the mixing period, there is a high possibility that the difference occurs between the rotation variation amount ΣΔNE and a value that corresponds to the actual cetane number along with the change in the cetane number thereafter. Therefore, in as case where the rotation variation amount ΣΔNE that is newly stored in the mixing period is a value indicative of the high cetane number area, and were the execution mode of the fuel injection control is switched to the execution mode that corresponds to the high cetane number area, the fuel injection control is executed in the execution mode that corresponds to the higher cetane number than the actual cetane number if the cetane number supplied to the internal combustion engine 11 is lowered thereafter. In this case, the combustion state of the fuel may become unstable.

In this embodiment, in a period from the ON operation of the operation switch 47 to the elapse of the mixing period (the time t12 to t13), the reflection of the rotation variation amount ΣΔNE to the fuel injection control is restricted even if the execution conditions are met and the rotation variation amount ΣΔNE is calculated and stored. In this example, the identified cetane number area is not stored in the electronic control unit 40 when the cetane number area that is identified by the rotation variation amount ΣΔNE is either the high cetane number area or the medium cetane number area, and the identified cetane number area is stored in the electronic control unit 40 when the cetane number area that is identified by the rotation variation amount ΣΔNE is the low cetane number area.

As described above, in this embodiment, when the rotation variation amount ΣΔNE is newly calculated and stored in the mixing period, the cetane number area that is stored in the electronic control unit 40, that is, the cetane number area that is used for the fuel injection control is only allowed to be updated to the area on the lower cetane number side. Therefore, it is possible to avoid a situation where the fuel injection control is executed in the execution mode that corresponds to the higher cetane number than the actual cetane number and also to favorably prevent the operation state of the internal combustion engine 11 from becoming unstable.

When the mixing period elapses thereafter (the time t13), the restriction to the reflection of the rotation variation amount ΣΔNE is canceled. Accordingly, if the execution conditions are met, and the rotation variation amount ΣΔNE is newly calculated and updated through the index value detection process at time t14 thereafter, the cetane number area is identified on the basis of the rotation variation amount ΣΔNE, and the cetane number area is newly stored as the cetane number area that is used for the fuel injection control. In this example, the medium cetane number area is identified and stored on the basis of the rotation variation amount ΣΔNE at this time, and the fuel injection control is executed in the execution mode that corresponds to the medium cetane number area.

As it has been described so far, according to this embodiment, the following effects can be obtained.

(1) The fuel injection control is executed in the execution mode that is based on the temporary index value VS when the fuel is fed into the fuel tank 32. Thus, despite the fact that the cetane number of the fuel supplied to the internal combustion engine 11 is changed immediately after the fuel feed, it is possible to prevent the operation state of the internal combustion engine 11 from becoming unstable through the execution of the fuel injection control based on the temporary index value VS. In addition, when the rotation variation amount ΣΔNE is newly calculated and stored in the mixing period, the fuel injection control is executed in a state that the reflection of the stored rotation variation amount ΣΔNE to the fuel injection control is restricted. Accordingly, it is possible to prevent, the engine operation state from becoming unstable that is caused by switching the execution mode of the fuel injection control to the execution mode that corresponds to the rotation variation amount ΣΔNE calculated in the mixing period, and thus the stable engine operation can be achieved immediately after the fuel is fed into the fuel tank 32.

(2) The temporary index value VS is calculated on the basis of the index value S1 of the cetane number of the fuel that is stored in the fuel tank 32 before the fuel feed, the amount of the fuel that is stored in the fuel tank 32 at the initiation of the fuel feed, the amount of the fuel that is fed into the fuel tank 32, and the predetermined prescribed cetane number index value S2. Thus, based on the temporary index value VS, it is possible to grasp the degree of possible reduction in the cetane number of the fuel in the fuel tank 32 after the fuel feed. Then, because the fuel injection control is executed in a second execution mode that is based on the temporary index value VS, it is possible to avoid a situation where the fuel injection control is executed in a manner that corresponds to the higher cetane number than the actual cetane number when the cetane number of the stored fuel in the fuel tank 32 is lowered by the fuel feed. Therefore, it is possible to favorably prevent the operation state of the internal combustion engine 11 from becoming unstable immediately after the feeding of the fuel into the fuel tank 32.

(3) The fuel injection to the internal combustion engine 11 is executed for the predetermined prescribed small amount FQ, and the index value of the output torque of the internal combustion engine 11 that is generated along with the execution of the fuel injection is detected as the cetane number index value of the fuel. Thus, the cetane number index value of the fuel can be detected on the basis of a relationship that the engine torque that is generated along with the combustion of the fuel is increased when the cetane number of the fuel that is supplied to the internal combustion engine 11 is large.

(4) The reflection of the rotation variation amount $\Sigma\Delta NE$ that is newly calculated in the mixing period to the fuel injection control is restricted such that the reflection is permitted in a circumstance where the combustion state of the fuel is improved and that the reflection is prohibited in a circumstance where the combustion state of the fuel is degraded under the assumption that the fuel injection control that corresponds to the rotation variation amount $\Sigma\Delta NE$ is executed. Thus, under the assumption that the rotation variation amount $\Sigma\Delta NE$ that is newly calculated and stored in the mixing period is reflected to the fuel injection control, the rotation variation amount $\Sigma\Delta NE$ can only be reflected to the fuel injection control when the improvement of the combustion state of the fuel is expected, and thus it is possible to appropriately prevent the operation state of the internal combustion engine 11 from becoming unstable.

Second Embodiment

A description will hereinafter be made on the control apparatus for the internal combustion engine according to a second embodiment that embodies the present invention with an emphasis on differences from the first embodiment.

In this embodiment, the above-described index value detection process (see FIG. 5) is executed in the mixing period, and a process of estimating a value that corresponds to the rotation variation amount $\Sigma\Delta NE$ at each time (an index value estimation process) is also executed on the basis of the rotation variation amount $\Sigma\Delta NE$ that is detected in the index value detection process.

Figure 12:
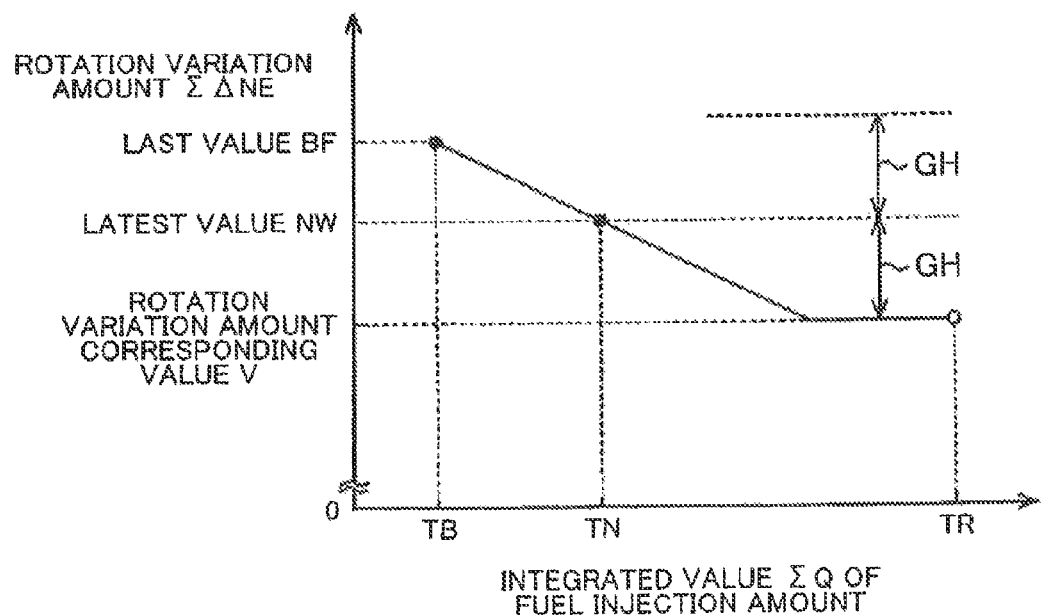
FIG. 12 is a schematic view for showing an example of a calculation mode of a rotation variation amount corresponding value according to a second embodiment that embodies the present invention.

A method of calculating a value that corresponds to the rotation variation amount $\Sigma\Delta NE$ (a rotation variation amount corresponding value V) will hereinafter be described in detail with reference to a specific example that is shown in FIG. 12.

The replacement of the fuel in the fuel pipe after the feeding of the fuel into the fuel tank 32 is progressed along with the fuel injection from the fuel injection valve 20, that is, consumption of the fuel in the internal combustion engine 11. Thus, it can be said that the change of the rotation variation amount $\Sigma\Delta NE$ in the mixing period is progressed along with the increase in the fuel consumption amount after the fuel feed (more specifically, the above-described integrated value $\Sigma Q$ of the fuel injection amount).

Therefore, it is possible to calculate a predicted value $\Delta VQbse$ for a magnitude of change of the rotation variation amount $\Sigma\Delta NE$ per unit injection amount on the basis of a latest value (NW) and a last value (BF) of the rotation variation amount $\Sigma\Delta NE$.

More specifically, as shown in FIG. 12, the predicted value $\Delta VQbse$ for the magnitude of change of the rotation variation amount $\Sigma\Delta NE$ per unit injection amount can be calculated from the following equation on the basis of the latest value NW, estimated timing TN thereof (more specifically, the integrated value $\Sigma Q$ during the detection of the latest value NW), the last value BF, and the estimated timing TB (more specifically, the integrated value $\Sigma Q$ during the detection of the last value BF).

$$\Delta VQbse = (NW - BF)/(TN - TB)$$

Then, a predicted value $\Delta VQ$ for a magnitude of entire change of the rotation variation amount $\Sigma\Delta NE$ ($=\Delta VQbse \times \Delta Q$) from the estimated timing TN to current timing TR can be calculated by multiplying the predicted value $\Delta VQbse$ by an elapsed period $\Delta T$ from the estimated timing TN of the latest value NW (more specifically, an amount of the fuel $\Delta Q[=TR-TN]$ that is injected from the estimated timing TN of the latest value NW to the current timing TR).

Furthermore, a value that corresponds to the current rotation variation amount $\Sigma\Delta NE$ (the rotation variation amount corresponding value $V[=NW+\Delta VQ]$) can be calculated by adding the predicted value $\Delta VQ$ of the magnitude of entire change to the latest value NW.

If the elapsed period $\Delta T$ from the estimated timing TN of the latest value NW is extended, an absolute value of the predicted value $\Delta VQ$ for the magnitude of entire change of the rotation variation amount $\Sigma\Delta NE$ is increased for the extension, the absolute value of the predicted value $\Delta VQ$ may be increased excessively. Thus, in this embodiment, instead of using the rotation variation amount corresponding value V that is calculated on the basis of the above-described concept, a value that is subjected to a guard process based on a magnitude of change limit GH is used for the rotation variation amount corresponding value V. In the guard process, more specifically, when the calculated rotation variation amount corresponding value V is smaller than a value in which the magnitude of change limit GH is subtracted from the latest value NW (NW−GH), the value (NW−GH) is stored as the new rotation variation amount corresponding value V. On the other hand, when the calculated rotation variation amount corresponding value V is larger than a value in which the magnitude of change limit GH is added to the latest value NW (NW+GH), the value (NW+GH) is stored as the new rotation variation amount corresponding value V.

A detailed description will hereinafter be made on an execution procedure of the index value estimation process.

Figure 13:
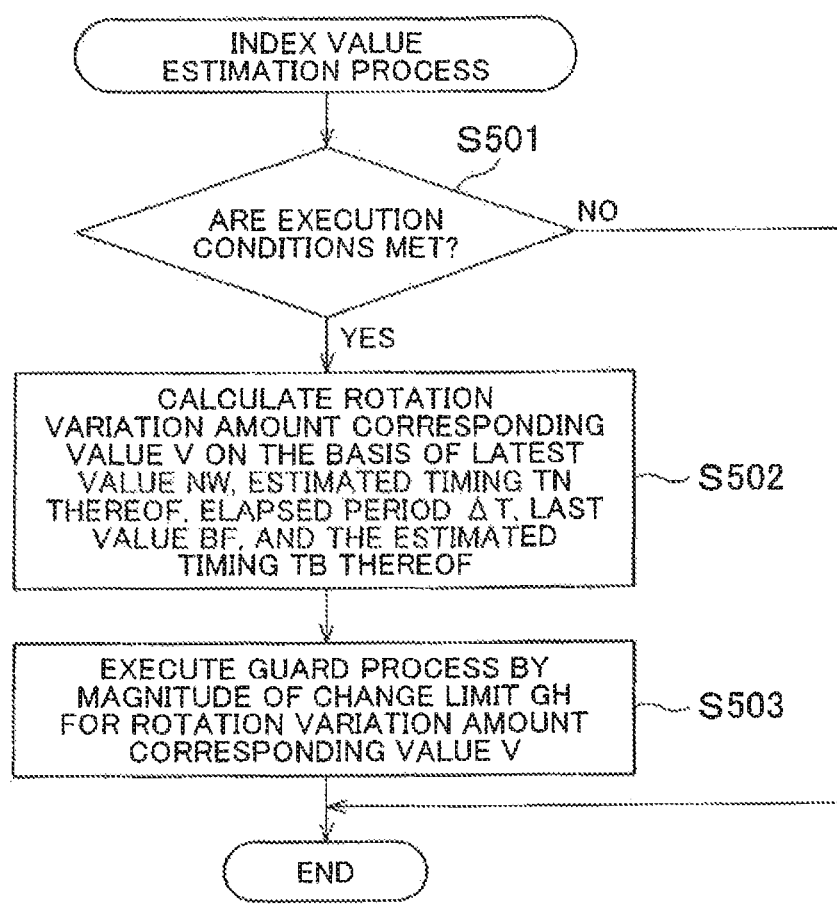
FIG. 13 is a flowchart for showing a specific execution procedure of an index value estimation process according to the second embodiment.

FIG. 13 is a flowchart for showing a specific execution procedure of the index value estimation process.

A series of process steps shown in the flowchart conceptually show the execution procedure of the index value estimation process, and the actual process is executed as the interruption process for each prescribed cycle by the electronic control unit 40.

As shown in FIG. 13, in this process, it is first determined whether or not the execution conditions are met (a step S501). Here, it is determined that the execution conditions are met if each of the following conditions is met.

In the mixing period.

The rotation variation amount ΣΔNE is detected for a plurality of times in the mixing period.

If the execution conditions are met (the step S501: YES), the rotation variation amount corresponding value V is calculated on the basis of the latest value NW, the estimated timing TN of the latest value NW, the elapsed period ΔT from the estimated timing TN, the last value BF, and the estimated timing TB of the last value BE (a step S502). In this embodiment, a computing equation for calculating the rotation variation amount corresponding value V on the basis of each of the values NW, TN, ΔT, BE, TB is defined in advance and stored in the electronic control unit 40. In the process of the step S502, the rotation variation amount corresponding value V is calculated from the computing equation.

Then, the guard process that is based on the magnitude of change limit GH for the rotation variation amount corresponding value V is executed in the above-described execution mode. In this embodiment, as the magnitude of change limit GH, an appropriate and constant value is calculated and set on the basis of the experiment or simulation result in order to guard the change in the rotation variation amount corresponding value V. After such a guard process is executed, this process is terminated.

In this embodiment, when the rotation variation amount corresponding value V is calculated through the execution of the index value estimation process, the cetane number area that is stored in the electronic control unit 40 is updated by using the rotation variation amount corresponding value V instead of the rotation variation amount ΣΔNE. More specifically, when the cetane number area that is identified by the rotation variation amount corresponding value V is the area on the lower cetane number side from the cetane number area that is stored at this time, the cetane number area is identified on the basis of the rotation variation amount corresponding value V, and the cetane number area is newly stored as the cetane number area that is used for the fuel injection control. On the other hand, when the cetane number area that is identified by the rotation variation amount corresponding value V is the area on the higher cetane number side from the cetane number area that is stored at this time or the same area as the cetane number area, the cetane number area that is used for the fuel injection control is not updated.

It is possible by executing the above-described index value estimation process to predict a mode of change of the rotation variation amount ΣΔNE in the mixing period and to calculate the value that corresponds to the rotation variation amount ΣΔNE for each time as the rotation variation amount corresponding value V on the basis of the prediction. Accordingly, under the assumption that the fuel injection control corresponding to the rotation variation amount ΣΔNE is executed, a determination of whether or not the combustion state of the fuel is improved can be made on the basis of the rotation variation amount ΣΔNE at the timing that the rotation variation amount ΣΔNE is detected, and can also be made on the basis of the rotation variation amount corresponding value V for each time. Therefore, compared with the apparatus in which the index value estimation process is not executed, the number of opportunities to reflect the rotation variation amount ΣΔNE (or the rotation variation amount corresponding value V) to the fuel injection control can be increased in order to improve the combustion state of the fuel, and thus it is possible to appropriately prevent the operation state of the internal combustion engine 11 from becoming unstable.

As it has been described so far, according to this embodiment, an effect described in the following (5) can be obtained in addition to the effects described in the above (1) to (4).

(5) When the rotation variation amount ΣΔNE is detected for the plurality of times in the mixing period, the rotation variation amount corresponding value V is calculated on the basis of the latest value NW, the estimated timing TN of the latest value NW, the elapsed period ΔT from the estimated timing TN, the last value BF, and the estimated timing TB of the last value BF; therefore, it is possible to appropriately prevent the operation state of the internal combustion engine 11 from becoming unstable.

Another Embodiment

Each of the above embodiments may be modified and implemented as follows.

As a condition to determine whether or not it is in the mixing period, the condition is not limited to that the integrated value ΣQ of the fuel injection amount after the feeding of the fuel into the fuel tank 32 is smaller than the prescribed amount, but any condition can be set. More specifically, a condition such as that a total operation time of the internal combustion engine 11 after the execution of the fuel feed is shorter than a prescribed time or that an integrated value of an intake air amount of the internal combustion engine 11 after the execution of the fuel feed is smaller than a prescribed amount may be set. In addition to the above condition, a condition to determine that the magnitude of change of the rotation variation amount ΣΔNE has become small and stable, such as a condition that a difference between the last value and the latest value of the rotation variation amount ΣΔNE is smaller than a prescribed value, may be set.

The cetane number index value S2 is not limited to be set to the index value of the lowest cetane number among the cetane numbers of the fuel possibly fed into the fuel tank 32, but may be set to an the index value of the slightly higher cetane number than the lowest cetane number. That is, as long as the value is set such that the cetane number area identified on the basis of the temporary index value VS is not the area on the higher cetane number side than the cetane number area within which the cetane number of the fuel in the fuel tank 32 falls, the value can be set to the cetane number index value S2.

Instead of calculating from the computation map, the temporary index value VS may be calculated from a computing equation. In this configuration, the relational expression [VS=(V1×S1+V2×S2)/(V1+V2)] may be stored in the electronic control unit 40 in advance, and the temporary index value VS may be calculated from the relational expression on the basis of the index value S1, the pre-feed stored amount V1, the fuel feed amount V2, and the prescribed cetane number index value S2.

The fuel injection control is executed not only in the execution mode in which the temporary index value VS is calculated and that corresponds to the temporary index value VS, but the fuel injection control may be executed in a predetermined execution mode. As such an execution mode, an execution mode that corresponds to the index value of the lowest cetane number among the cetane numbers of the fuel possibly fed into the fuel tank 32 or an execution mode that corresponds to the index value of the slightly higher cetane number than the lowest cetane number can be adopted. That is, any execution mode can be adopted as far as the stable operation of the internal combustion engine 11 is given more importance when compared to the execution mode that corresponds to the rotation variation amount ΣΔNE stored in the electronic control unit 40.

If an error of the fuel injection timing or the fuel injection amount that is caused by the initial individual difference or aging of the fuel injection valve 20 can appropriately be suppressed, the process to correct the target injection timing TQst and the target injection time TQtm by the correction terms K1, K2 (the step S202 in FIG. 6) may not be executed.

The control apparatus according to each of the above embodiments may be adopted for an apparatus that determines either one of two areas divided by the index value of the cetane number of the fuel (the rotation variation amount ΣΔNE) or an apparatus that determines either one of four or more areas by appropriately changing the configuration thereof.

As the control for changing the execution mode according to the cetane number area that is identified on the basis of the rotation variation amount ΣΔNE or the temporary index value VS, instead of or in addition to adopting the control to set the requested injection timing Tst, the EGR control or pilot injection control may be adopted. That is any control can be adopted as control for changing the execution mode according to the cetane number area as long as it is the combustion control for the combustion of the fuel in the internal combustion engine 11, in other words, the combustion control for adjusting the combustion state of the fuel in the internal combustion engine 11. In the apparatus for which the EGR control is adopted as such combustion control, the EGR control may be executed such that an EGR amount is reduced as the area is on the lower cetane number side. In addition, in the apparatus for which the pilot injection control is adopted as the combustion control, the pilot injection control may be executed such that a pilot injection amount is increased as the area is on the lower cetane number side, for example.

The control apparatus according to each of the above embodiments can be adopted for an apparatus that defines the execution control of the fuel injection control according to the rotation variation amount ΣΔNE itself without identifying the cetane number area on the basis of the rotation variation amount ΣΔNE stored in the electronic control unit 40 by appropriately changing the configuration thereof. In such an apparatus, when the fuel is fed into the fuel tank 32, the temporary index value VS may be calculated on the basis of the rotation variation amount ΣΔNE, the pre-feed stored amount V1, and the fuel feed amount V2 that are detected before the fuel feed and stored in the electronic control unit 40, and the execution mode of the fuel injection control may be defined according to the temporary index value VS.

The control apparatus according to each of the above embodiments can be adopted for an apparatus that estimates the cetane number of the fuel itself on the basis of the rotation variation amount ΣΔNE stored in the electronic control unit 40 and that executes the fuel injection control in an execution mode that corresponds to the estimated cetane number by appropriately changing the configuration thereof. In such an apparatus, when the fuel is fed into the fuel tank 32, the temporary index value of the cetane number of the fuel may be calculated on the basis of the cetane number estimated value, the pre-feed stored amount V1, and the fuel feed amount V2 that are estimated before the fuel feed and stored in the electronic control unit 40, and the fuel injection control may be executed on the basis of the temporary index value.

A value other than the rotation variation amount ΣΔNE may be calculated as the index value of the output torque of the internal combustion engine 11. For example, during the execution of the index value detection process, the engine speed NE during the execution of the fuel injection and the engine speed NE immediately before the fuel injection are detected, a difference these speeds is calculated, and the difference can be used as the index value.

A mode of attachment of the pressure sensor 41 is not limited to a mode of direct attachment to the fuel injection valve 20 and can be changed to any mode as long as the fuel pressure that varies along with the change in pressure serving as an index of the fuel pressure in the fuel injection valve 20 (more specifically, in the nozzle chamber 25), that is, the fuel pressure can appropriately be detected. More specifically, a pressure sensor may be attached to the branch passage 31a or the common rail 34.

Instead of the fuel injection valve 20 of the type that is driven by the piezoelectric actuator 29, the fuel injection valve of a type that is driven by an electromagnetic actuator including a solenoid coil, for example, may be adopted.

The control apparatus according to the above embodiments can be adopted for a vehicle in which a torque converter and an automatic transmission are mounted in addition to the vehicle 10 in which the clutch mechanism 13 and the manual transmission 14 are mounted. In such a vehicle, the fuel injection for estimating the cetane number of the fuel may be executed when [Condition 1] and [Condition 3] are met, for example. It should be noted that, in a vehicle that a torque converter with a built-in lock-up clutch is adopted, [Condition 4] in which the lock-up clutch is not engaged may be newly set, and the fuel injection for detecting the cetane number index value of the fuel may be executed on a condition that [Condition 4] is met.

The present invention is not only adopted for the apparatus that executes the fuel injection (auxiliary fuel injection) for estimating the cetane number, but can also be adopted for an apparatus that estimates the cetane number of the fuel supplied to the internal combustion engine 11 and that executes the combustion control in an execution mode corresponding to the estimated cetane number. A following apparatus can be raised as such an apparatus. More specifically, first, when the prescribed execution conditions are met, and when the fuel injection for operating the internal combustion engine is executed, pressure in the cylinder of the internal combustion engine (cylinder internal pressure) is detected by a cylinder internal pressure sensor. Then, timing at which the fuel is actually ignited is calculated on the basis of the cylinder internal pressure, and ignition delay time is calculated on the basis of the timing. Next, an average value of the thus-calculated ignition delay time is calculated, and the cetane number index value is calculated on the basis of the average value. The combustion control is then executed in the execution mode that corresponds to the cetane number index value.

The present invention is not limited to the apparatus that estimates the cetane number of the fuel supplied to the internal combustion engine, but the present invention can be adopted for any apparatus as long as the apparatus estimates a fuel property other than the cetane number and executes the fuel injection in the execution mode that corresponds to the estimated fuel property. As such a fuel property, for example, an oxygen containing amount or a heating value of the gasoline fuel or the diesel fuel, the cetane number of the fuel in the internal combustion engine that uses the gasoline fuel, and the alcohol fuel mixing rate of the fuel in the internal combustion engine that can use either one of the gasoline fuel and the alcohol fuel or the mixed fuel thereof can be raised. In the apparatus in which the oxygen containing amount of the fuel is adopted as the fuel property, because a difference in the oxygen containing amount of the fuel is reflected to a change in the air-fuel ratio of the mixed gas, more specifically, to the air-fuel ratio detected by the air-fuel ratio sensor, it is possible to estimate the oxygen containing amount of the fuel on the basis of the air-fuel ratio that is detected by the air-fuel ratio sensor. In addition, in the apparatus in which the heating value or the alcohol fuel mixing rate of the fuel is adopted as the fuel property, because a difference in the heating value or the alcohol fuel mixing rate is reflected to a change in the output torque or a change in the cylinder internal pressure of the internal combustion engine 11 or to a change in an exhaust temperature, the heating value or the alcohol fuel mixing rate can be estimated on the basis of the index value of the output torque, the cylinder internal pressure, or the exhaust temperature of the internal combustion engine 11.

The present invention is not limited to the internal combustion engine with four cylinders but can also be adopted for an internal combustion engine with a single cylinder, an internal combustion engine with two cylinders, an internal combustion engine with three cylinders, or an internal combustion engine with five cylinders or more.

DESCRIPTION OF THE REFERENCE NUMERALS AND SYMBOLS

10: VEHICLE
11: INTERNAL COMBUSTION ENGINE
12: CRANKSHAFT
13: CLUTCH MECHANISM
14: MANUAL TRANSMISSION
15: WHEEL
16: CYLINDER
17: INTAKE PASSAGE
18: PISTON
19: EXHAUST PASSAGE
20: FUEL INJECTION VALVE
21: HOUSING
22: NEEDLE VALVE
23: INJECTION HOLE
24: SPRING
25: NOZZLE CHAMBER
26: PRESSURE CHAMBER
27: INLET PASSAGE
28: COMMUNICATION PASSAGE
29: PIEZOELECTRIC ACTUATOR
29a: VALVE BODY
30: DISCHARGE PASSAGE
31a: BRANCH PASSAGE
31b: SUPPLY PASSAGE
32: FUEL TANK
33: FUEL PUMP
34: COMMON RAIL
35: RETURN PASSAGE
40: ELECTRONIC CONTROL UNIT
41: PRESSURE SENSOR
42: CRANK SENSOR
43: ACCELERATOR SENSOR
44: VEHICLE SPEED SENSOR
45: CLUTCH SWITCH
46: STORED AMOUNT SENSOR
47: OPERATION SWITCH

The invention claimed is:

1. A control apparatus for an internal combustion engine including a fuel injection valve, comprising:
an electronic control unit configured to:
 i) determine an actual operation property of the fuel injection valve by monitoring a fluctuation waveform of fuel pressure in the fuel injection valve during execution of fuel injection,
 ii) set fuel injection timing and an fuel injection amount that correspond to an operation state of the internal combustion engine by correcting requested injection timing and requested injection time of the fuel injection valve on the basis of the actual operation property of the fuel injection valve,
 iii) execute drive control of the fuel injection valve on the basis of target injection timing and target injection time and execute the fuel injection from the fuel injection valve,
 iv) store a rotation variation amount as an index value of output torque of the internal combustion engine that is generated along with the fuel injection,
 v) estimate cetane number as a fuel property on the basis of the rotation variation amount,
 vi) execute combustion control for combustion of the fuel in a first execution mode that corresponds to the estimated fuel property,
 vii) calculate a temporary estimated fuel property on the basis of an amount of the fuel stored in the fuel tank during initiation of the feeding of the fuel, the estimated fuel property that is estimated during the initiation of the feeding of the fuel, an amount of the fuel that is fed into the fuel tank, and a prescribed fuel property in a period that the property of the fuel supplied to the internal combustion engine is changed due to feeding of the fuel into a fuel tank, and execute the combustion control in a second execution mode on the basis of the temporary estimated fuel property, and
 viii) execute the combustion control while restricting reflection of the estimated fuel property when estimation of the fuel property is executed.

2. The control apparatus for an internal combustion engine according to claim 1,
wherein the fuel is diesel fuel, and the fuel property is the cetane number.

3. The control apparatus for an internal combustion engine according to claim 2,
wherein, in addition to basic injection control that executes the fuel injection in an amount corresponding to an operation state of the internal combustion engine, the electronic control unit executes auxiliary injection control that executes the fuel injection for estimating the cetane number of the fuel, detects an index value of engine torque generated along with the execution of the auxiliary injection control, and stores the detected index value as the estimated fuel property.

4. The control apparatus for an internal combustion engine according to claim 1, wherein, under an assumption that the combustion control corresponding to the estimated fuel property is executed, the electronic control unit permits the reflection of the estimated fuel property that is estimated by the estimating section in the period if a combustion state of the fuel is improved, and prohibits the reflection if the combustion state of the fuel is degraded.

5. The control apparatus for an internal combustion engine according to claim 1, wherein, when the estimated fuel property is estimated for a plurality of times in the period that the fuel property is changed, the electronic control unit calculates a value that corresponds to the estimate fuel property for each time on the basis of a latest value of the estimated fuel property, estimated timing of the latest value, a last value of the estimated fuel property, estimated timing of the last value, and an elapsed period from the estimated timing of the latest value.

6. The control apparatus for an internal combustion engine according to claim 1, wherein the period that the fuel property is changed is a period until the entire fuel in a fuel pipe for supplying the fuel in the fuel tank to the internal combustion engine is replaced by the fuel that is pressure-fed from the fuel tank into the fuel pipe after the feeding of the fuel.

* * * * *